US012593921B2

(12) United States Patent
Song

(10) Patent No.: US 12,593,921 B2
(45) Date of Patent: Apr. 7, 2026

(54) SEAT SUPPORT

(71) Applicant: Tao Song, Ganzhou City (CN)

(72) Inventor: Tao Song, Ganzhou City (CN)

( * ) Notice: Subject to any disclaimer, the term of this patent is extended or adjusted under 35 U.S.C. 154(b) by 236 days.

(21) Appl. No.: 18/512,043

(22) Filed: Nov. 17, 2023

(65) Prior Publication Data

US 2024/0090672 A1 Mar. 21, 2024

Related U.S. Application Data

(63) Continuation-in-part of application No. 18/099,239, filed on Jan. 19, 2023, now Pat. No. 11,858,397.

(30) Foreign Application Priority Data

Sep. 20, 2022 (CN) .......................... 202222494353.4

(51) Int. Cl.
*A47C 7/52* (2006.01)
*B60N 3/06* (2006.01)

(52) U.S. Cl.
CPC . *A47C 7/52* (2013.01); *B60N 3/06* (2013.01)

(58) Field of Classification Search
CPC .................................... A47C 7/52; B60N 3/06
See application file for complete search history.

(56) References Cited

U.S. PATENT DOCUMENTS 10,166,902 B2 * 1/2019 Cayzer ................... B60N 2/995
11,432,527 B1 * 9/2022 Pan ....................... B60N 2/6027

FOREIGN PATENT DOCUMENTS

DE 4238363 A1 * 5/1993 ........... B60N 2/6027
DE 19516846 A1 * 11/1996 ........... B60N 2/6054

* cited by examiner

*Primary Examiner* — Anthony D Barfield
(74) *Attorney, Agent, or Firm* — Hemisphere Law, PLLC

(57) ABSTRACT

The present disclosure provides a seat support applied to a vehicle, the vehicle has a front seat assembly and a back seat assembly. The seat support includes a support member, a connecting member and a fixing assembly. The support member includes a support portion arranged on the back seat assembly. The connecting member is arranged on the support portion and configured to connect the support portion with the front seat assembly. The fixing assembly is arranged on the support portion and configured to fix the support portion with the back seat assembly.

18 Claims, 34 Drawing Sheets

31c

3c

11c

21c

2c

23c

24c

22c

100j

117j

118j

11n

48n″

47n″

205n

SEAT SUPPORT

CROSS REFERENCE TO RELATED APPLICATIONS

This application is a continuation-in-part of application Ser. No. 18/099,239 filed on Jan. 19, 2023, now U.S. Pat. No. 11,858,397 the entire disclosure of which is hereby incorporated by reference herein.

FIELD

This present disclosure relates to supports, and in particular to a seat support for use in conjunction with seats during travel.

BACKGROUND

Travelling has become a very common part of life. People often travel for long periods during which time they are seated in a chair and are generally sedentary. In particular, travelling in airplanes requires a passenger to be seated in a cramped position for many hours; travelling in trains, buses and the like can further see a passenger seated for long periods of time in awkward and uncomfortable positions.

Sitting for long periods can become very uncomfortable and can lead to tired and aching muscles, swollen legs, deep vein thrombosis (DVT) and even the life threatening condition of pulmonary emboli. Furthermore, it can be difficult to sleep in an upright seated position and travelers can often become sleep deprived. All of these factors make travelling for long periods uncomfortable.

Accordingly, it would be advantageous of the present disclosure to provide a technical solution which ameliorates one or more of the disadvantages set forth above or at least provide the public with a useful choice.

SUMMARY

In a first aspect, the present disclosure provides a seat support applied to a vehicle, the vehicle has a front seat assembly and a back seat assembly. The seat support includes a support member, a connecting member and a fixing assembly. The support member includes a support portion arranged on the back seat assembly. The connecting member is arranged on the support portion and configured to connect the support portion with the front seat assembly. The fixing assembly is arranged on the support portion and configured to fix the support portion with the back seat assembly.

In a second aspect, the present disclosure provides a seat support applied to a vehicle, the vehicle has a front seat assembly and a back seat assembly. The seat support includes a support member, a connecting member, and an adjusting assembly. The support member includes a support portion arranged on the back seat assembly. The connecting member is arranged on the support portion and configured to connect the support portion with the front seat assembly. The adjusting assembly is configured to connect the support portion with the connecting member at a region of the support portion to prevent the support portion from sagging.

In a third aspect, the present disclosure provides a seat support applied to a vehicle, the vehicle has a front seat assembly and a back seat assembly. The seat support includes a support member, a connecting member, and an adjusting assembly. The support member includes a support portion arranged on the back seat assembly. The connecting member is arranged on the support portion and configured to connect the support portion with the front seat assembly. The adjusting assembly is configured to connect the support portion with the front seat assembly at a portion of the support portion according to a gap between the front seat assembly and the back seat assembly to prevent the support portion from sagging.

BRIEF DESCRIPTION OF THE DRAWINGS

Implementations of the present disclosure will now be described, by way of embodiment, with reference to the attached FIGS. It should be understood, the drawings are shown for illustrative purpose only, for ordinary person skilled in the art, other drawings obtained from these drawings without paying creative labor by an ordinary person skilled in the art should be within scope of the present disclosure.

Figure 1:
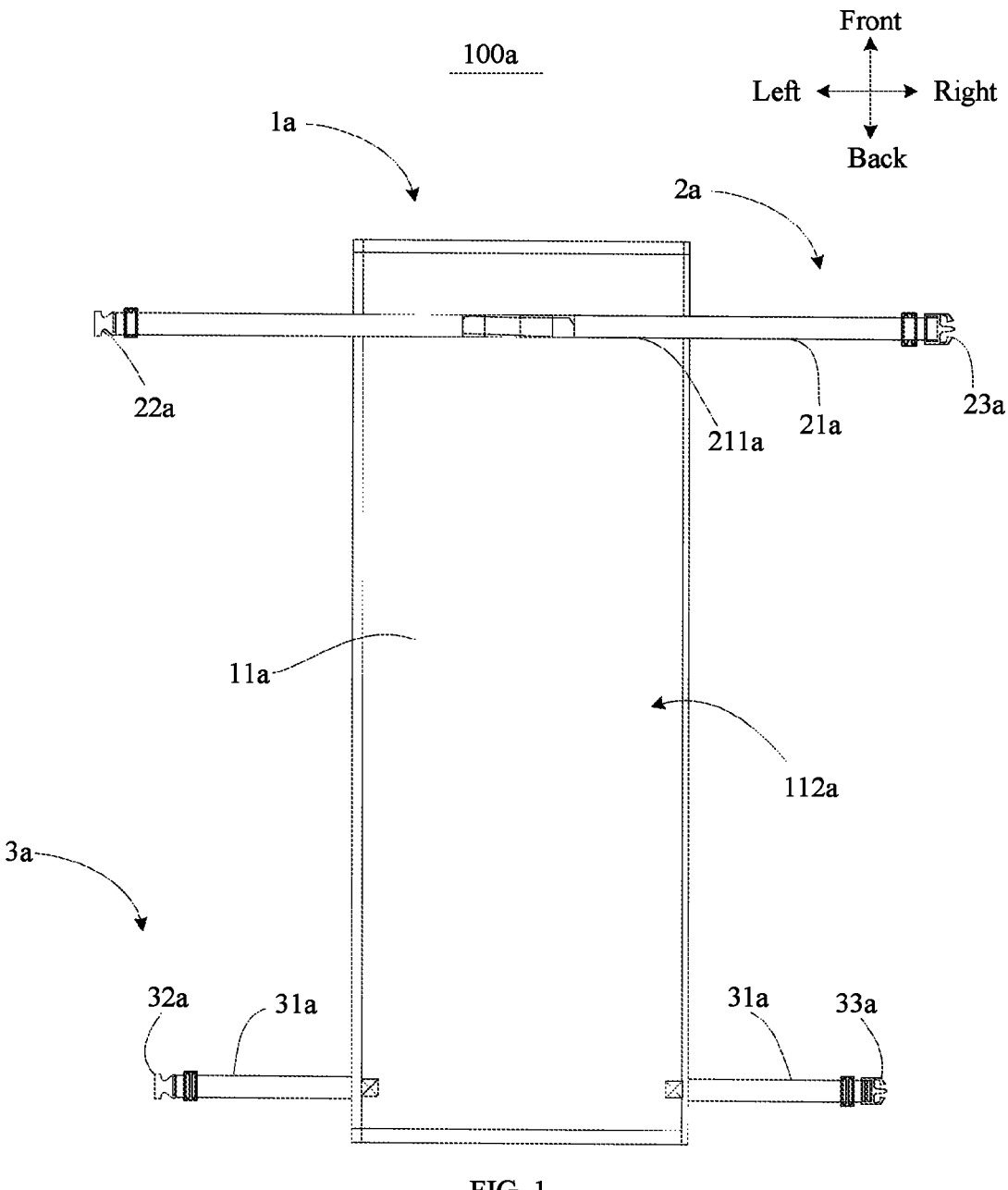
FIG. 1 is a structural diagram of a seat support according to a first embodiment of the present disclosure.

The realization of the aim, functional characteristics, advantages of the present disclosure are further described specifically with reference to the accompanying drawings and embodiments.

DETAILED DESCRIPTION

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present invention without creative efforts shall fall within the protection scope of the present invention.

It is to be understood that, all of the directional instructions in the exemplary embodiments of the present disclosure (such as top, down, left, right, front, back) can only be configured to explaining relative position relations, moving condition of the elements under a special form (referring to figures), and so on, if the special form changes, the directional instructions change accordingly.

In addition, the descriptions, such as the "first", the "second" in the present disclosure, can only be configured to describing the aim of description, and cannot be understood as indicating or suggesting relative importance or impliedly indicating the number of the indicated technical character. Therefore, the character indicated by the "first", the "second" can express or impliedly include at least one character. In addition, the technical proposal of each exemplary embodiment can be combined with each other, however the technical proposal must base on that the ordinary skill in that art can realize the technical proposal, when the combination of the technical proposals occurs contradiction or cannot realize, it should consider that the combination of the technical proposals does not exist, and is not contained in the protection scope required by the present disclosure.

Referring to FIGS. 1-5 and 20, the present disclosure provides a seat support 100a according to a first embodiment.

The seat support 100a includes a support member 1a, a first connecting member 2a and a second connecting member 3a. The support member 1a includes a support portion 11a and an anti-skid portion 12a. The support portion 11a is a sheet, the support portion 11a includes a back side 1101a and a front side 1102a, and the anti-skid portion 12a is arranged on the back side 1101a of the support portion 11a. The first connecting member 2a is fixedly connected with a first end (i.e. a front end) of the support portion 11a, and the first connecting member 2a and the first end of the support member 1a enclose a first connecting portion 24a. The second connecting member 3a is fixedly connected with a second end (i.e. a rear end) of the support portion 11a, and the second connecting member 3a and the second end enclose a second connecting portion 34a. In an embodiment, the anti-skid portion 12a is an anti-skid layer arranged on the back side 1102a, and the anti-skid layer 12a is made of an anti-skid material, such as silicone, rubber, nylon, and woven materials with rough surfaces.

The seat support 100a is connected with the seats of a vehicle, such as a car, a bus, a high-speed train, an airplane, and the like. A part of the seat support 100a is arranged on a seat cushion 2011 of the back seat assembly 201 and connected with a backrest 2013 of the back seat, and another part of the seat support 100a is connected with the front seat assembly 202. An area of the seat support 100a between the seat cushion 2011 and the front seat assembly 202 is regarded as a suspension portion 2012. User can sit on the seat cushion 2011 of the back seat assembly 201, and place legs and foot on the suspension portion 2012. In this way, user's legs are supported and the pressures on the legs are relieved, and the seat support 100a provides the user with a more comfortable seated position or a flat extended base for sleeping. The anti-skid portion 12a on the support member 1a can increase a friction between the support member 1a and the seat cushion 2011. Even if user continuously adjusts his sitting postures, the support member 1a can fit with the seat cushion 2011 orderly. The support portion 11a is a sheet, that is, the support portion 11a is thin, small in size and light in weight, so the seat support 100a can be easily carried when traveling.

Specifically, the first connecting member 2a is fixedly connected with the front seat assembly 202, and the second connecting member 3a is fixedly connected with the back seat assembly 201. In this way, the support member 1a is firmly connected between the back seat assembly 201 and the front seat assembly 202. It should be understood that the first connecting member 2a and the second connecting member 3a are both provided with an adjustment buckle (not labeled), lengths of the first connecting member 2a and the second connecting member 3a can be adjusted to adapt to the seats with different sizes, so the support member 1a is firmly connected between the back seat assembly 201 and the front seat assembly 202. Of course, the first connecting member 2a and the second connecting member 3a can further be elastic, and the sizes of the first connecting member 2a and the second connecting member 3a can further be adjusted.

The first connecting member 2a includes a covering portion 211a covering the support portion 11a, and at least a part of the covering portion 211a is not sewn with the support portion 11a, or the covering portion 211a is completely sewn with the support portion 11a; the covering portion 211a passes or extends through the support portion 11a, and the covering portion 211a is a one-piece structure.

The support member 1a is flatly laid between the front seat assembly 202 and back seat assembly 201, and the first connecting member 2a and the second connecting member 3a are used to fix the support member 1a. The first connecting member 2a is fixedly connected with the front seat assembly 202, and the second connecting member 3a is fixedly connected with the back seat assembly 201. In this way, the support member 1a can be stably arranged between the front seat assembly 202 and the back seat assembly 201, and the suspension portion 2012 of the support member 1a can support user's feet and the legs, thereby alleviating the acid swellings and numbness of the feet and the legs. The anti-skid portion 12a can increase the friction between the support portion 11a and the seat cushion 2011, so that the support portion 11a will not move under a movement of user.

Figure 2:
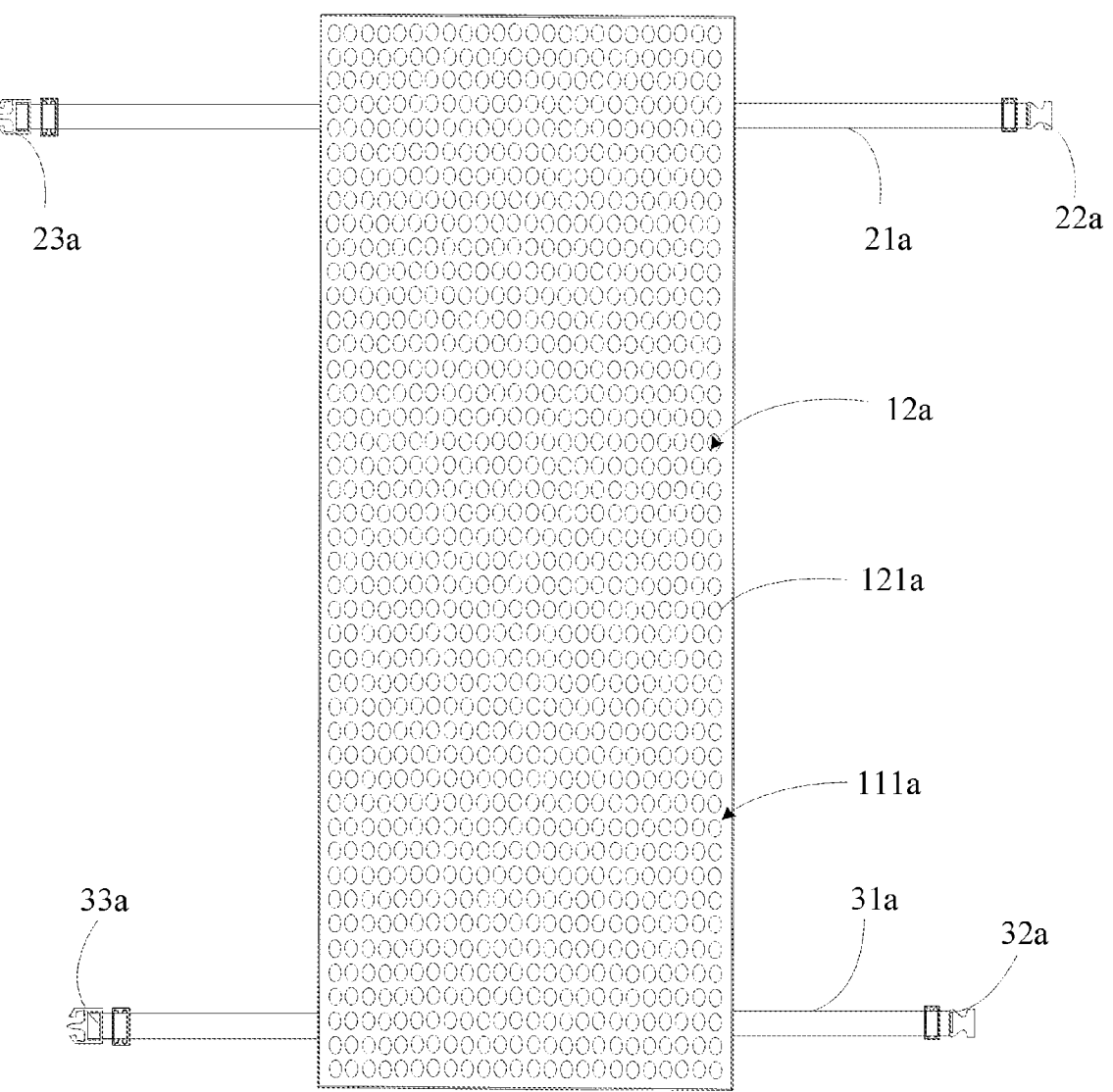
FIG. 2 is another structural diagram of the seat support in FIG. 1.
Figure 3:
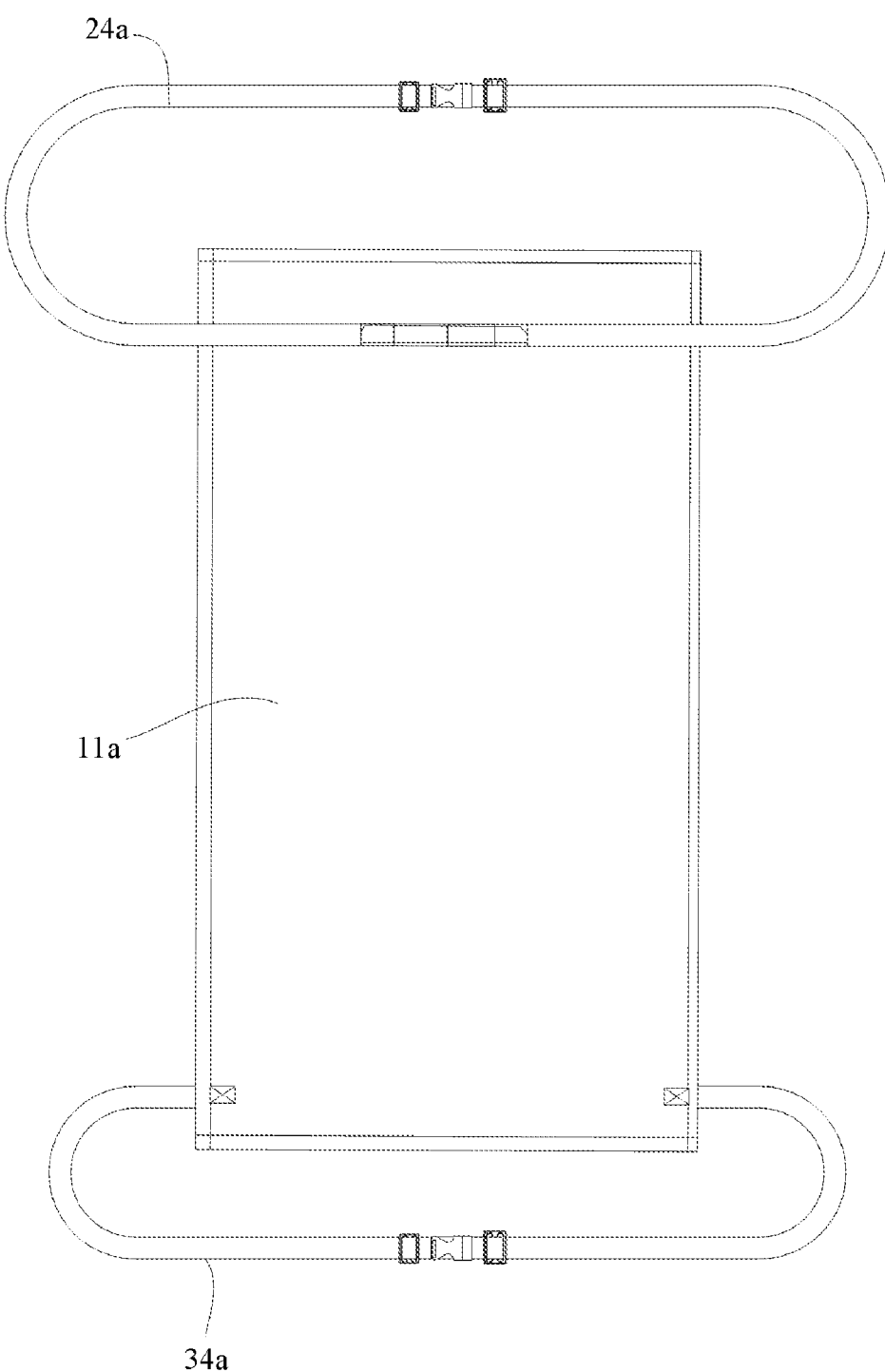
FIG. 3 is a structural diagram of the seat support in FIG. 1, wherein each of the first connecting member and the second connecting member is in a connected state.
Figure 4:
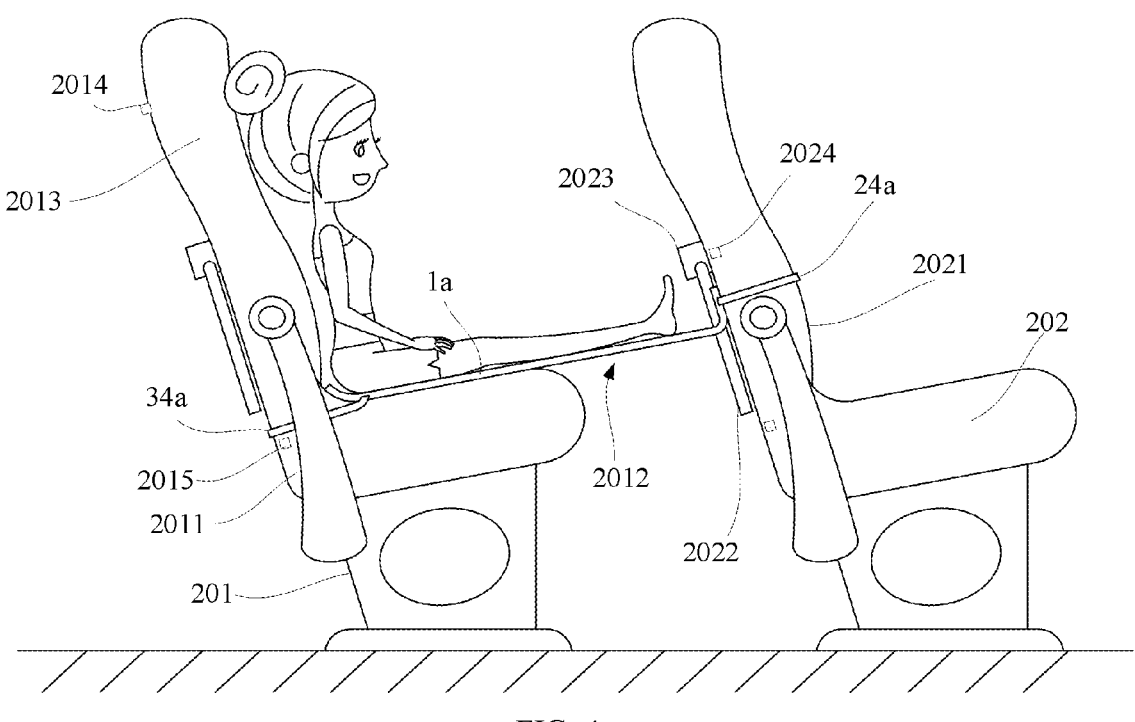
FIG. 4 is a structural diagram of the seat support in FIG. 1, and the seat support is fixed to front and back seats.
Figure 5:
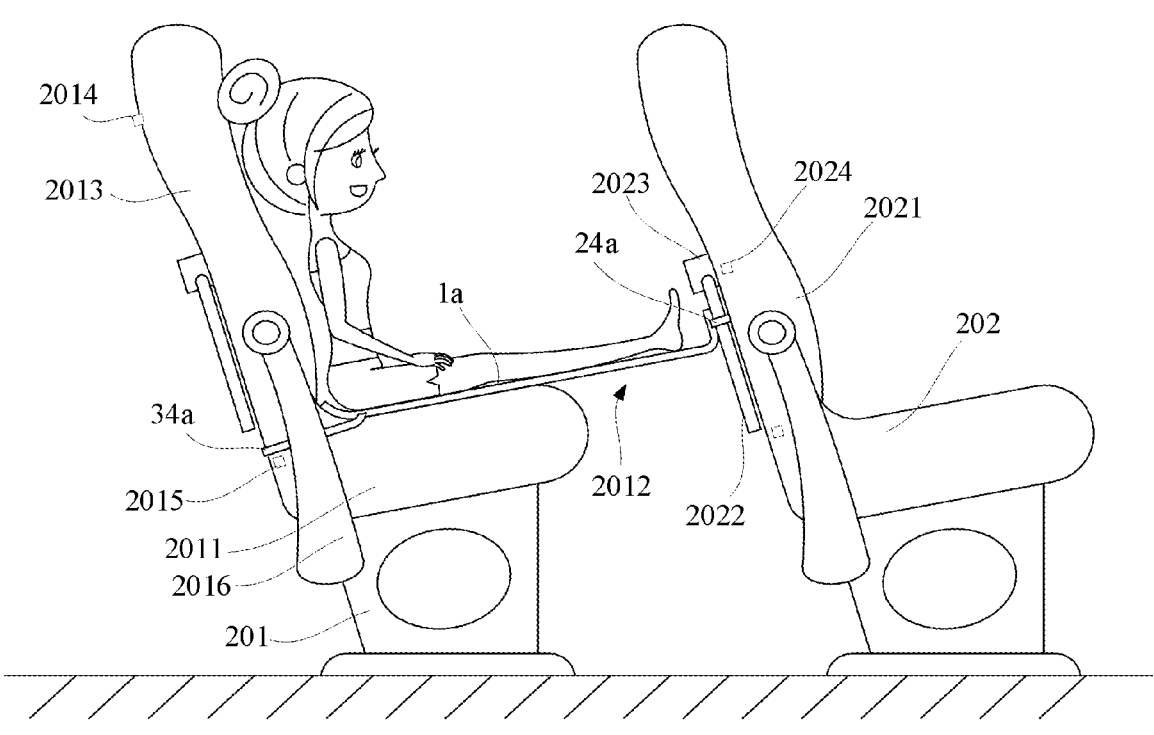
FIG. 5 is another structural diagram of the seat support in FIG. 1, and the seat support is fixed to front and back seats.

Further, referring to FIGS. 1-2, the support portion 11a is made of flexible material. The support portion 11a includes an inner layer 111a and a surface layer 112a fixedly connected with the inner layer 111a. The anti-skid portion 12a is arranged on the inner layer 111a and protruded from an outer surface of the inner layer 111a. Specifically, a periphery of the inner layer 111a is fixedly connected with a periphery of the surface layer 112a. In one embodiment, areas of the inner layer 111a except the periphery are not separated from areas of the surface layer 112a except the periphery, that is, the inner layer 111a is completely fixedly with the surface layer 112a. In another embodiment, at least a portion of areas of the inner layer 111a except the periphery is fixedly connected with an area of the surface layer 112a except the periphery, that is, the inner layer 111a is not completely fixedly with the surface layer 112a. In a further embodiment, at least a portion of areas of the inner layer 111a except the periphery is separated from an area of the surface layer 112a except the periphery, that is, the inner layer 111a is not completely fixedly with the surface layer 112a.

In order to facilitate the storage and enhance user comfort, the support portion 11a is made of a flexible material. The support portion 11a is preferably made of a breathable flexible material, so it's very breathable for the user's hip, legs and feet. The support portion 11a has a double-layer structure, which is convenient to increase the thickness of the support portion 11a. So that, the user will not feel the presence of the anti-skid portion 12a when sitting on the support portion 11a. Further, it is further conducive to the setting of the anti-skid portion 12a on the thick support portion 11a. When the anti-skid portion 12a is made of plastic materials, the plastic materials are usually injected onto the inner layer 111a, and the inner layer 111a is set thinner, which can facilitate the attachment of plastic materials. It should be understood that in order to further increase the comfort of the support portion 11a, sponge or cotton can be filled between the inner layer 111a and the surface layer 112a.

Further, please referring to FIG. 2, the inner layer 111a is made of flexible material, such as cloth, fiber, paper cloth, velvet, polyurethane, PVC (Polyvinyl Chloride) flocking, etc. The periphery of the inner layer 111a is fixedly connected with the periphery of the surface layer 112a. The anti-skid portion 12a is arranged on the outer surface of the inner layer 111a. The inner layer 111a is also fixedly connected to a middle portion of the surface layer 112a.

The anti-skid portion 12a includes a plurality of anti-skid bumps 121a, which are arranged on the outer surface of the inner layer 111a. The anti-skid bump 121a is made of plastic, silicone, or rubber. The anti-skid bumps 121a are uniformly arranged on the back side; or the anti-skid bumps 121a are randomly arranged on the back side. The anti-skid bump 121a has a diameter of about 0-200 mm, for example, the anti-skid bump 121a has a diameter of 0.1 mm, 1 mm, 2 mm, 3 mm, 4 mm, 5 mm, 10 mm, 50 mm, 100 mm, 150 mm, or 200 mm. The anti-skid bump 121a has a height of about 0-20 mm, for example, the anti-skid bump 121a has a height of 0.1 mm, 0.2 mm, 0.5 mm, 1 mm, 1.5 mm, 2 mm, 5 mm, 10 mm, 15 mm, or 20 mm. A space between two adjacent anti-skid bumps 121a is about 0-200 mm, for example, the space between two adjacent anti-skid bumps 121a is 0.1 mm, 1 mm, 2 mm, 3 mm, 4 mm, 5 mm, 10 mm, 50 mm, 100 mm, 150 mm, or 200 mm. The anti-skid bumps 121a are arranged in a plurality of bump groups, diameters of bumps in each bump groups gradually decrease or increase in a direction from the back seat assembly 201 to the front seat assembly 202, or heights of bumps in each bump groups gradually decrease or increase in a direction from the back seat assembly 201 to the front seat assembly 202.

The cloth material has a good air permeability, and the anti-skid portion 12a can be quickly bonded with the inner layer 111a during injection molding. In order to ensure that the anti-skid portion 12a will not affect the comfort of the seat support 100a, the anti-skid portion 12a is set as a plurality of anti-skid bumps 121a, so that user can hardly feel the presences of the anti-skid bumps 121a even when he is sitting on the support portion 11a.

Further, a thickness of the surface layer 112a is greater than that of the inner layer 111a. The thinner inner layer 111a can facilitate a rapid prototyping of anti-skid bumps 121a, and the thicker surface layer 112a can reduce the presences of anti-skid bumps 121a.

Further, the inner layer 111a and the surface layer 112a are made of flexible material, such as cloth, fiber, paper cloth, polyurethane, PVC (Polyvinyl Chloride) flocking, etc., and the periphery of the inner layer 111a is sewn and fixedly connected with the periphery of the surface layer 112a. The cloth has a good air permeability. Both the surface layer 112a and the inner layer 111a are made of cloth, so the surface layer 112a and the inner layer 111a can be easily stored, carried and cleaned.

Further, both the first connecting member 2a and the second connecting member 3a are fixedly connected with the outer surface of the surface layer 112a of the support portion 11a, to prevent the first connecting member 2a and the second connecting member 2a from affecting the arrangement of the anti-skid portion 12a. In another embodiment, the first connecting member 2a or the second connecting member 3a can also be arranged on an inner surface of the surface layer 112a or an inner surface of the inner layer 111a. In a further embodiment, the first connecting member 2a or the second connecting member 3a can also be arranged on an outer surface of the inner layer 111a.

Further, referring to FIGS. 1 and 2, the first connecting member 2a includes a connecting belt 21a (which can be a long mesh belt) connected with the first end of the support portion 11a, a connecting part 22a (which can be a clamping seat), and a connecting part 23a (which can be a clamping head). A middle section of the connecting belt 21a is at least partially fixed with the support portion 11a, and both ends of the connecting belt 21a extend outside the support portion 11a. In an embodiment, a portion of the middle section of the connecting belt 21a is not fixed with the support portion 11a to form a handle (not labeled). One end of the connecting belt 21*a* is connected with the connecting part 22*a*, the other end is connected with the connecting part 23*a*. When the connecting part 22*a* is detachably connected with the connecting part 23*a*, the connecting belt 21*a*, the connecting part 22*a*, the connecting part 23*a*, the support portion 11*a* enclose the connecting portion 24*a*. The connecting belt 21*a* may be connected with the inner layer 111*a* or the surface layer 112*a* or connected between the inner layer 111*a* and the surface layer 112*a*.

The second connecting member 3*a* includes two connecting belts 31*a* (which can be medium length mesh belt), a connecting part 32*a* (which can be a clamping seat) and a connecting part 33*a* (which can be a clamping head). One end of each connecting belt 31*a* is fixedly connected with a corner at the second end of the support portion 11*a*, and the other end extends out of the support portion 11*a*. One of the two connecting belts 31*a* is fixedly connected with the connecting part 32*a*, the other one is fixedly connected with the connecting part 33*a*. When the connecting part 32*a* is clamped with the connecting part 33*a*, the two connecting belts 31*a*, the connecting part 32*a*, the connecting part 33*a* and the support portion 11*a* enclose the second connecting portion 34*a*.

The connecting part 22*a* is clamped with the connecting part 23*a* to form a ring shaped connecting portion 24*a*. The ring shaped connecting portion 24*a* sleeves on the backrest 2021 of the front seat assembly 202 (see FIG. 4), or sleeves on a table 2022 arranged on the front seat assembly 202 (see FIG. 5), or sleeves on a connecting element 2023 which is configured to rotatably connect the table 2022 with the backrest 2021. In detail, both ends of the connecting belt 21*a* can pass the backrest 2021 of the front seat assembly 202 from both sides, and then the connecting part 22*a* is clamped in the connecting part 23*a*, so that the seat support 100*a* can be connected with the front seat assembly 202 rapidly. The two second connecting belts 31*a* may be asymmetrically connected with the support portion 11*a*, or the two second connecting belts 31*a* may have different lengths, so seat support 100*a* has a high fault tolerance. The second connecting belts 31*a* form an annular second connecting portion 34*a* by connecting the connecting part 32*a* with the connecting part 33*a*. The second connecting portion 34*a* can sleeve on the back seat assembly 201, to connect the seat support 100*a* with the back seat assembly 201. The second connecting portion 34*a* may be installed in the same way as the first connecting portion, so it will not be described here.

It should be understood that the connecting belt 21*a* and the connecting belt 31*a* are fixedly connected with the support portion 11*a* by sewing. In this way, the connecting belt 21*a* and the connecting belt 31*a* are relatively stably connected with the support portion 11*a*. It should be understood that the connecting part 22*a* is adapted to the connecting part 23*a*, and the two can be connected and matched with each other. This connection mode is simple and reliable, and is convenient for users to operate.

Figure 6:
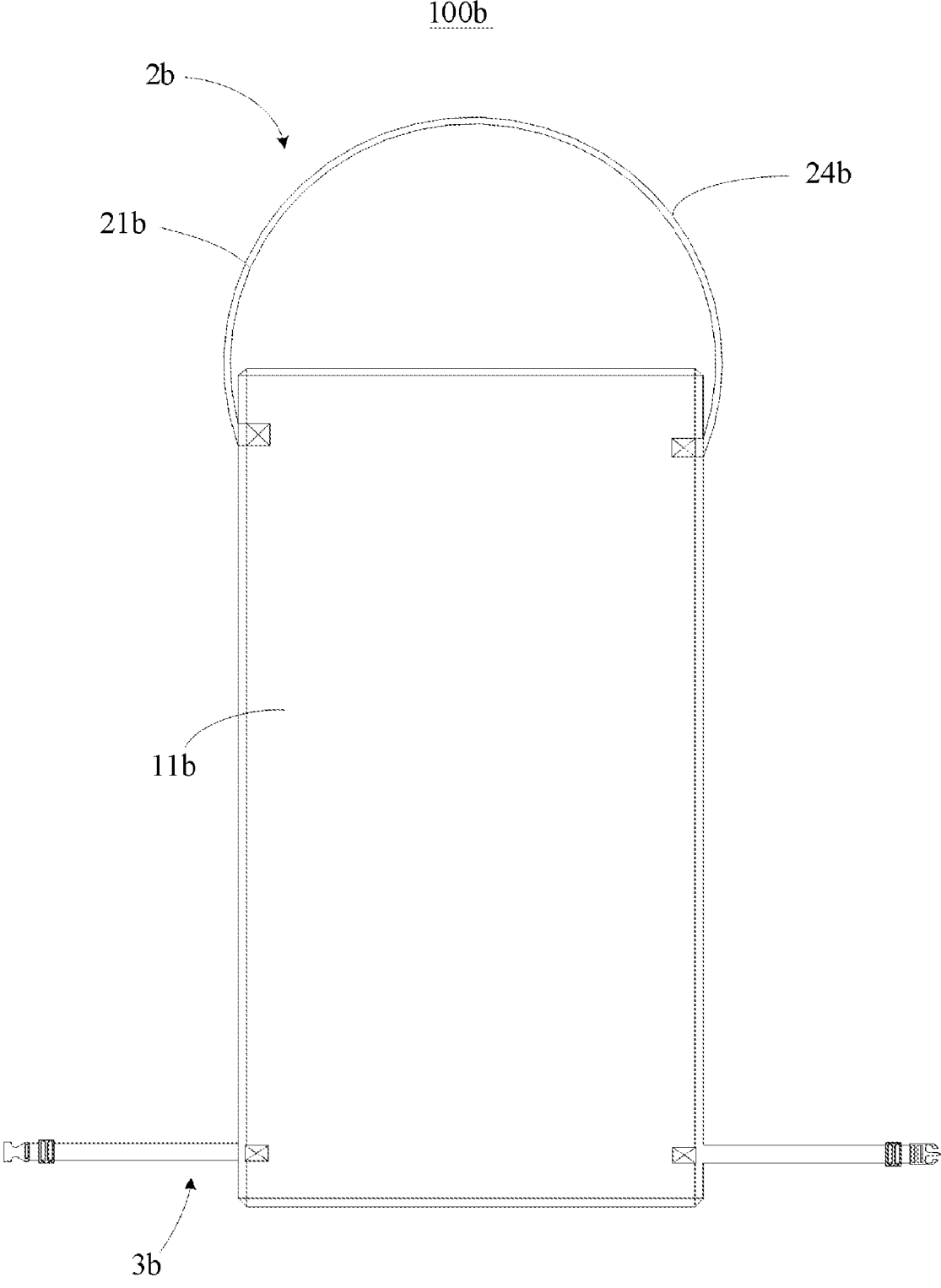
FIG. 6 is a structural diagram of a seat support according to a second embodiment of the present disclosure.

Referring to FIG. 6, the present disclosure provides a seat support 100*b* according to a second embodiment. The seat support 100*b* is similar to the seat support 100*a* in structure, and the differences between the two at least include: the first connecting member 2*b* is an elastic belt 21*b*, two ends of the elastic belt 21*b* are fixedly connected with two corners of the first end of the support portion 11*a*, and the elastic belt 21*b* and the support portion 11*a* enclose the connecting portion 24*b*.

User can adjust the length of the elastic belt 21*b* more quickly than the buckle. The two ends of the elastic belt 21*b* are fixedly connected with the support portion 11*b* to forms the annular connecting portion 24*b* which can sleeve on the front seat assembly 202.

The second connecting member 3*b* is similar with the second connecting member 3*a* in structure.

Figure 7:
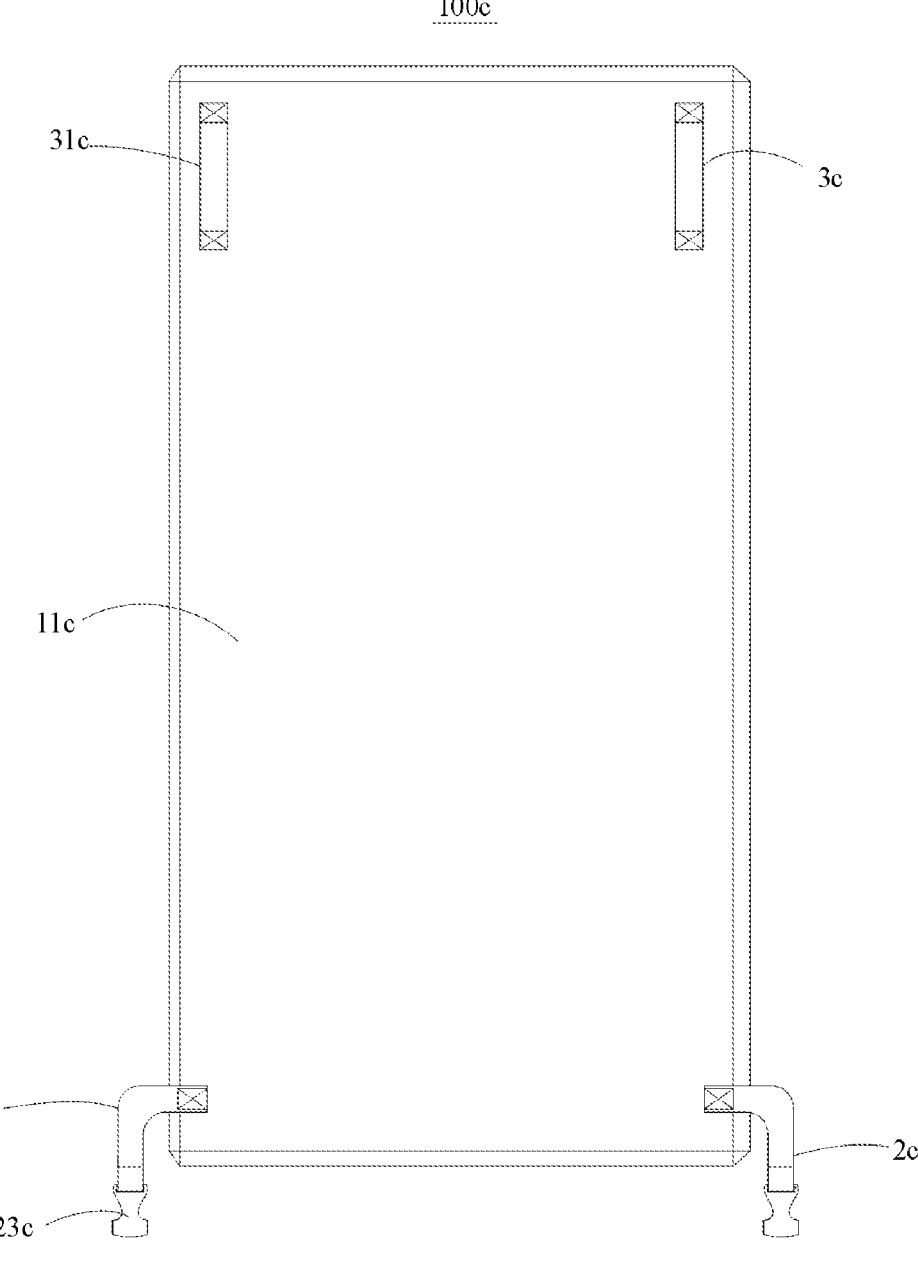
FIG. 7 is a structural diagram of a seat support according to a third embodiment of the present disclosure.
Figure 7:
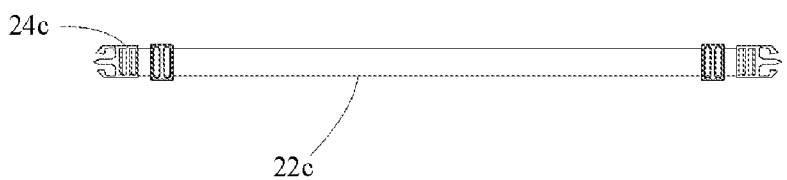
Figure 8:
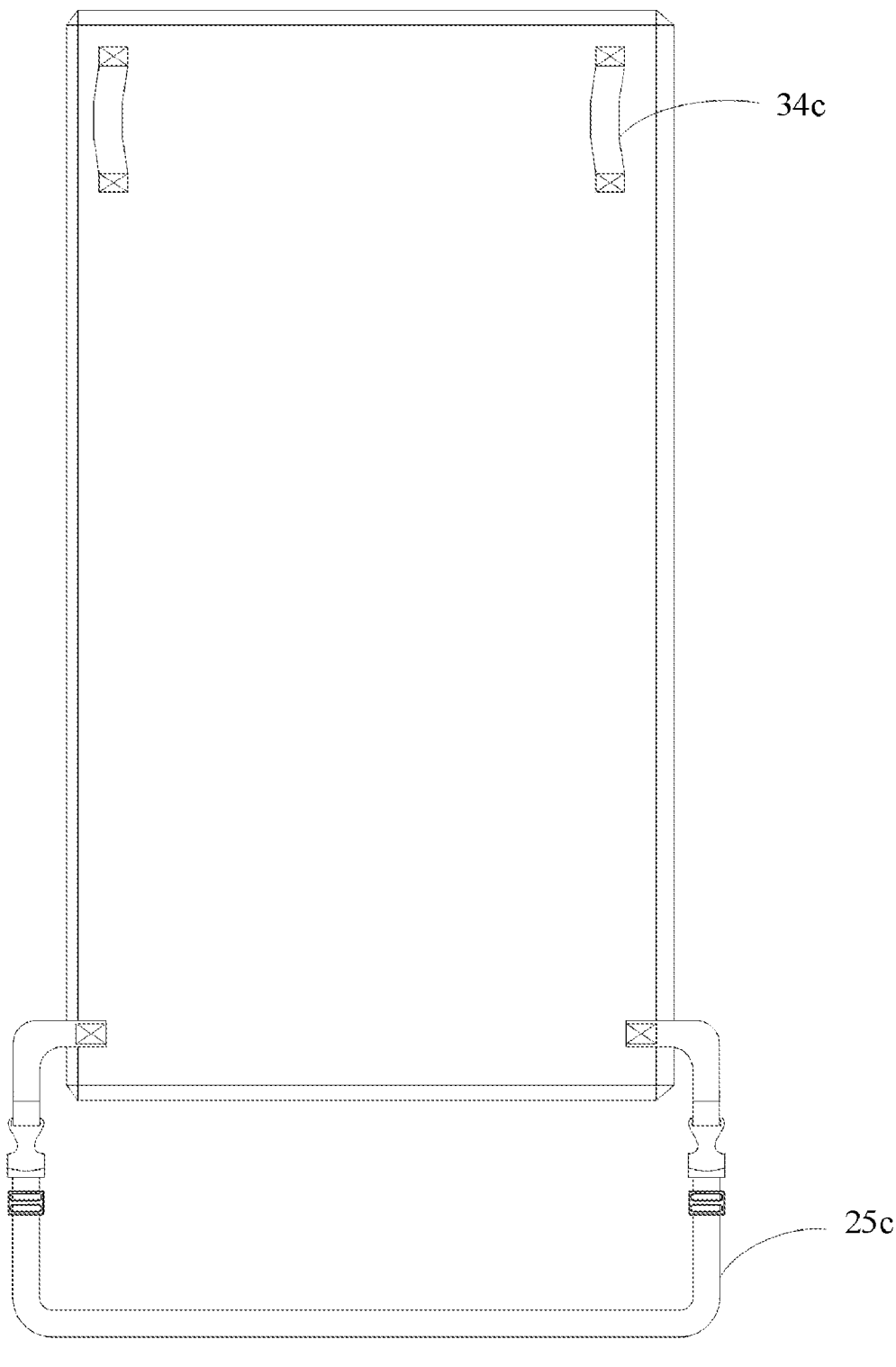
FIG. 8 is a structural diagram of the seat support in FIG. 7, wherein the first connecting member is in a connected state.

Referring to FIGS. 7-8, the present disclosure provides a seat support 100*c* according to a third embodiment. The seat support 100*c* is similar to the seat support 100*a* in structure, and the differences between the two at least include: the second connecting member 3*c* includes two connecting belts 31*c* (which can be short mesh belts), both ends of each connecting belt 31*c* are fixedly connected with a corner of the second end of the support portion 11*c*, and a middle portion of each connecting belt 31*c* is separated from the support portion 11*c* to form a connecting portion 34*c* for the safety belt 2016 to pass through; the first connecting member 2*c* includes two connecting belts 21*c* (which can be short mesh belts), a connecting belt 22*c* (which can be a mesh belt with a medium length), two connecting parts 23*c* (which can be clamping seats), and two connecting parts 24*c* (which can be clamping heads); ends of the two connecting belts 21*c* are fixedly connected with two corners of the first end of the support portion 11*c*, other ends of the two connecting belts 21*c* bently extend out of the support portion 11*c* and connect with the two connecting parts 23*c* respectively; both ends of the connecting belt 22*c* are respectively connected with two connecting parts 24*c*; the connecting parts 23*c* are clamped with the connecting parts 24*c*; two connecting belts 21*c*, the connecting belt 22*c*, the connecting parts 23*c*, the connecting parts 24*c*, and the support portion 11*c* form the connecting portion 25*c* which can sleeve on the backrest 2021 of the front seat assembly 202 or sleeve on the connecting element 2023 on the rear surface of the backrest 2021 or connect with the table 2022 of front seat assembly 202; ends of the two connecting belts 31*c* are fixed on the support portion 11*c*, and the two connecting belts 31*c* and the support portion 11*c* cooperatively form the connecting portions 34*c*; the safety belts 2016 of the back seat assembly 201 can pass through the two connecting portions 34*c* respectively, and then user fixes the safety belts, so that the second connecting member 3*c* can further be fixed.

In another embodiment, the second connecting member 3*c* is the same as the second connecting member 3*e*, the first connecting member 2*a*, or the second connecting member 3*b*.

Figure 9:
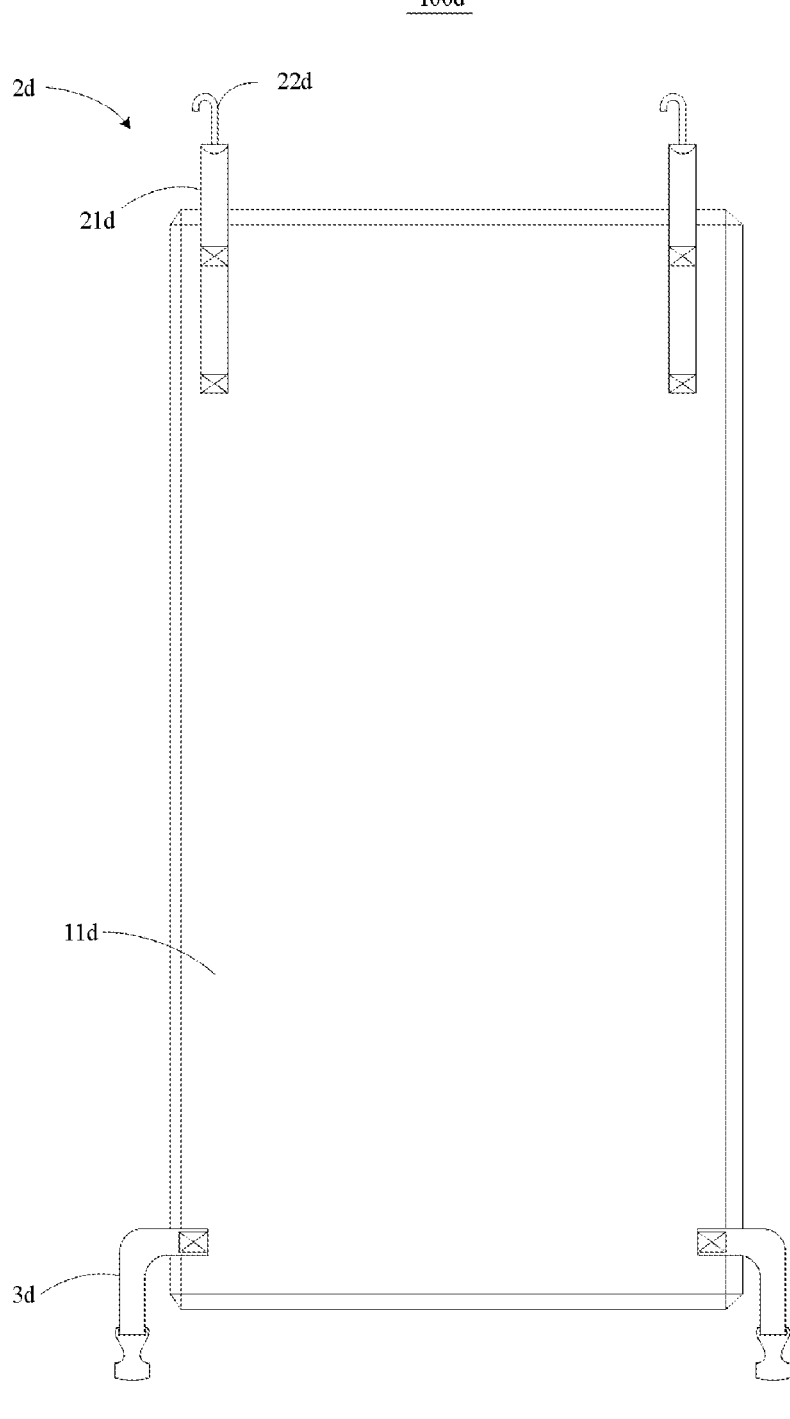
FIG. 9 is a structural diagram of a seat support according to a fourth embodiment of the present disclosure.
Figure 10:
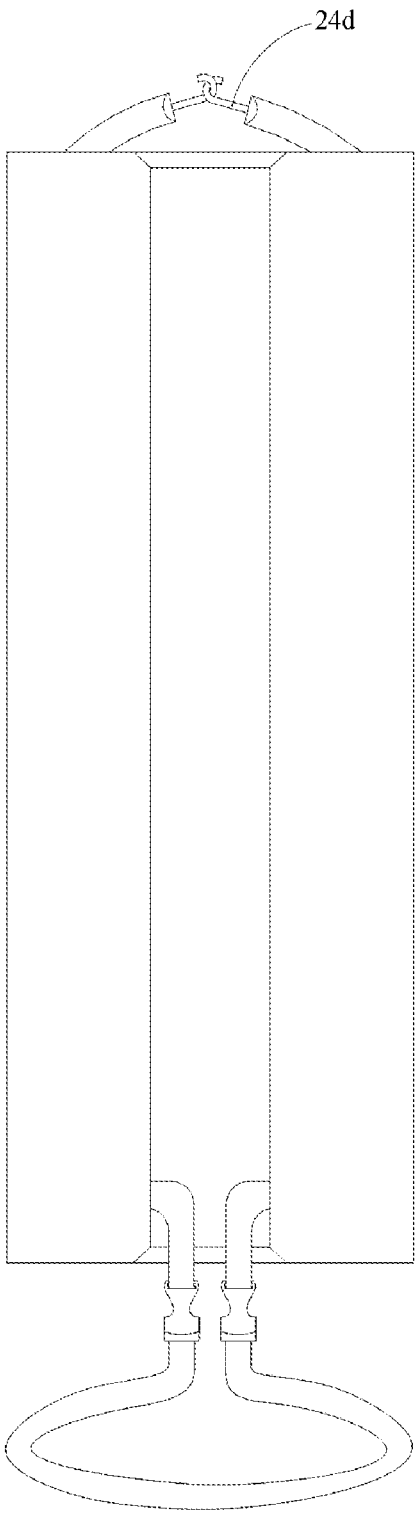
FIG. 10 is a structural diagram of the seat support in FIG. 9, wherein the first connecting member and the second connecting member are in a connected state.
Figure 11:
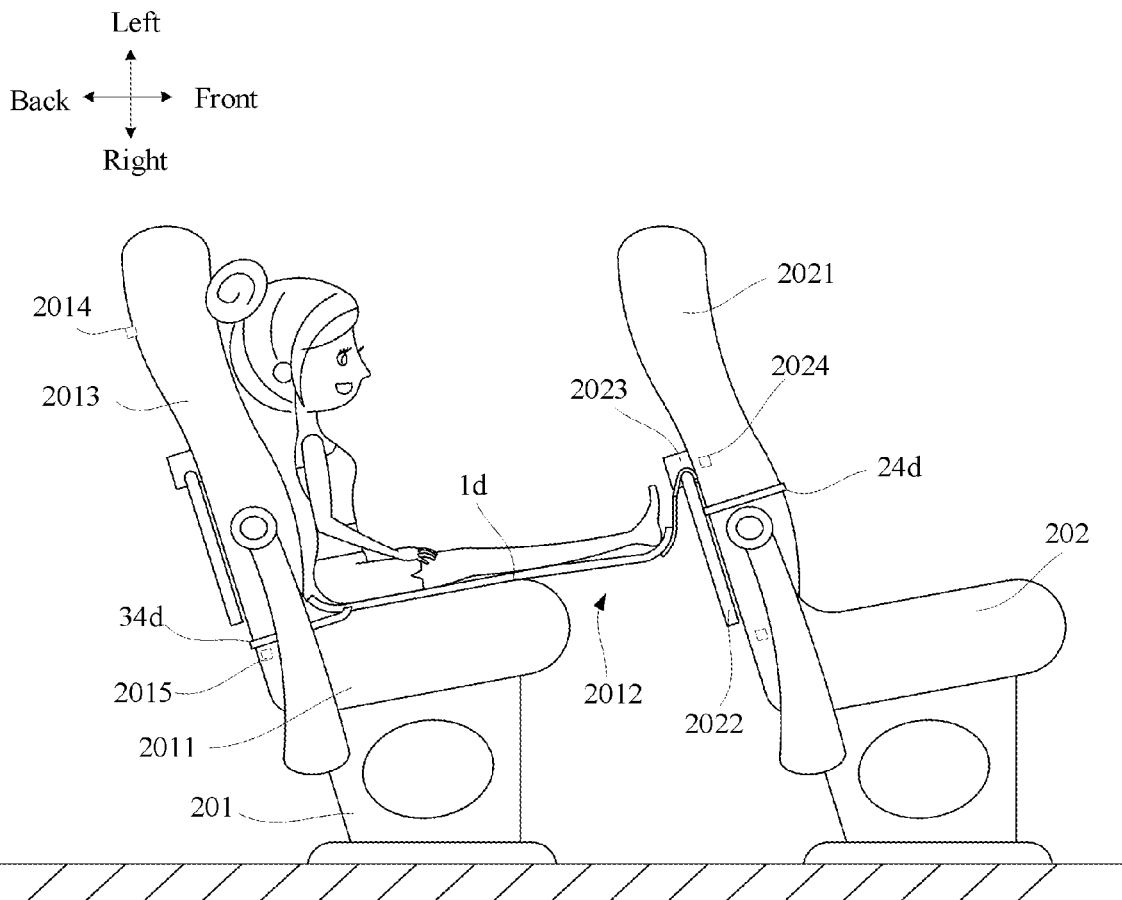
FIG. 11 is a structural diagram of the seat support in FIG. 9, and the seat support is fixed to front and back seats.

Referring to FIGS. 9-11, the present disclosure provides a seat support 100*d* according to a fourth embodiment. The seat support 100*d* is similar to the seat support 100*c* in structure, and the differences between the two at least include: the first connecting member 2*d* includes two connecting belts 21*d* (which can be short mesh belts) and two connecting parts 22*d* (which can be locking hooks, hangers, etc.); end of the two connecting belt 21*d* are fixed at two corners of the first end of the support portion 11*d*, the other ends of the two connecting belts 21*d* are respectively fixedly connected with the connecting parts 22*d*.

The connecting parts 22*d* can be connected with the connecting element 2023 arranged on the backrest 2021 of the front seat assembly 202, or connected with buckles 2024 of the front seat assembly 202 arranged on the side surfaces of the backrest 2021, or connected with the table 2022 of the front seat assembly 202, or sleeve around the backrest 2021 of the front seat assembly 202. The buckles 2024 of the front seat assembly 202 are used for hanging luggage, so the first end of the seat support 100*d* can be fixed on the front seat assembly 202. It should be understood that the two connecting parts 22*d* may also be connected to each other to form a connecting portion 24*d* which is configured to connect with the table 2022 or the connecting element 2023 of the front seat assembly 202.

In an embodiment, the connecting parts 22*d* can be connected with the buckles 2015 arranged on two sides of the backrest 2013, to connect the seat support 100*d* with the back seat assembly 201. In another embodiment, the connecting parts 22*d* are fixed in the gap between the backrest 2013 and the seat cushion 2011, to connect the seat support 100*d* with the back seat assembly 201.

The second connecting member 3*d* is similar as the first connecting member 2*c* in structure.

Figure 12:
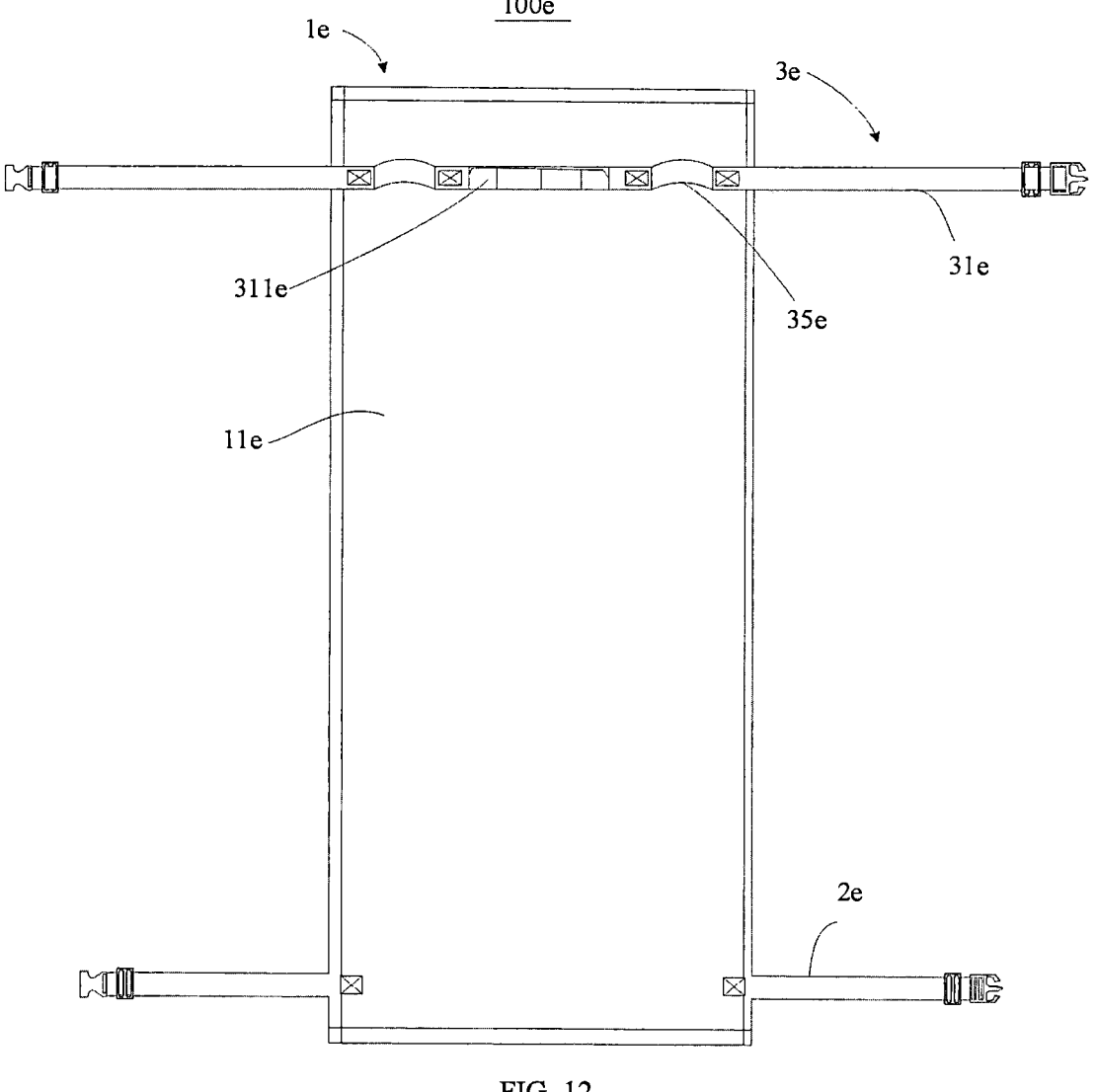
FIG. 12 is a structural diagram of a seat support according to a fifth embodiment of the present disclosure.

Referring to FIG. 12, the present disclosure provides a seat support 100*e* according to a fifth embodiment. The seat support 100*e* is similar to the seat support 100*a* in structure, and the differences between the two at least include: the connecting belt 31*e* of the second connecting member 3*e* includes a covering portion 311*e* covering the support portion 11*e*, and at least a part of the covering portion 311*e* is not sewn with the support portion 11*e* to form the connecting portion 35*e*; the covering portion 311*e* pass through the support portion 11*e* along a radial direction of the support portion 11*e*. The covering portion 311*e* is a one-piece structure.

In an embodiment, two portions of the covering portion 311*e* are not sewn with the support portion 11*e* to form two connection portions 35*e* spaced at intervals.

The safety belts 2016 of the back seat assembly 201 can pass through the two connecting portions 35*e* respectively, and then user fixes the safety belts 2016. In this way, the two connecting members 3*e* can further be fixed.

The connecting member 2*e* is similar with the connecting member 3*a* in structure.

Figure 13:
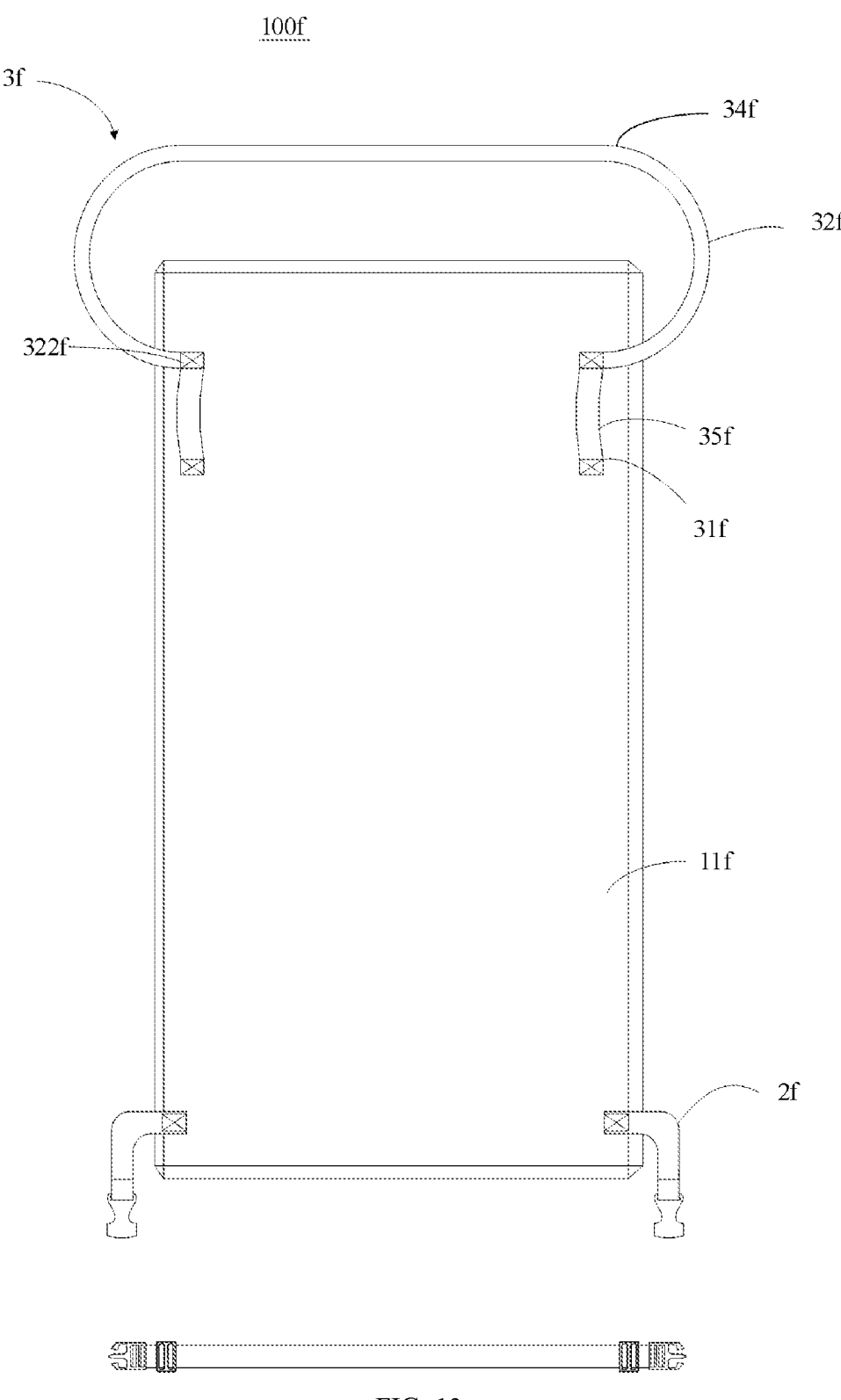
FIG. 13 is a structural diagram of a seat support according to a sixth embodiment of the present disclosure.

Referring to FIG. 13, the present disclosure provides a seat support 100*f* according to a sixth embodiment. The seat support 100*f* is similar to the seat support 100*c* in structure, and the differences between the two at least include: the second connecting member 3*f* includes two connecting belts 31*f* and an elastic belt 32*f*, and both ends of the elastic belt 32*f* are respectively connected with both ends of the support portion 11*f* to form the connecting portion 34*f* which can sleeve on the backrest 2013; both ends of the connecting belt 31*f* are connected with the support portion 11*f* to form the connecting portion 35*f* for the safety belt 2016 to pass through.

The suturing portion of the elastic belt 32*f* and the support portion 11*f* at least partially coincides with the suturing portion of the connecting belt 31*f* and the support portion 11*f*.

The connecting member 2*f* is similar with the connecting member 3*d* in structure.

Figure 14:
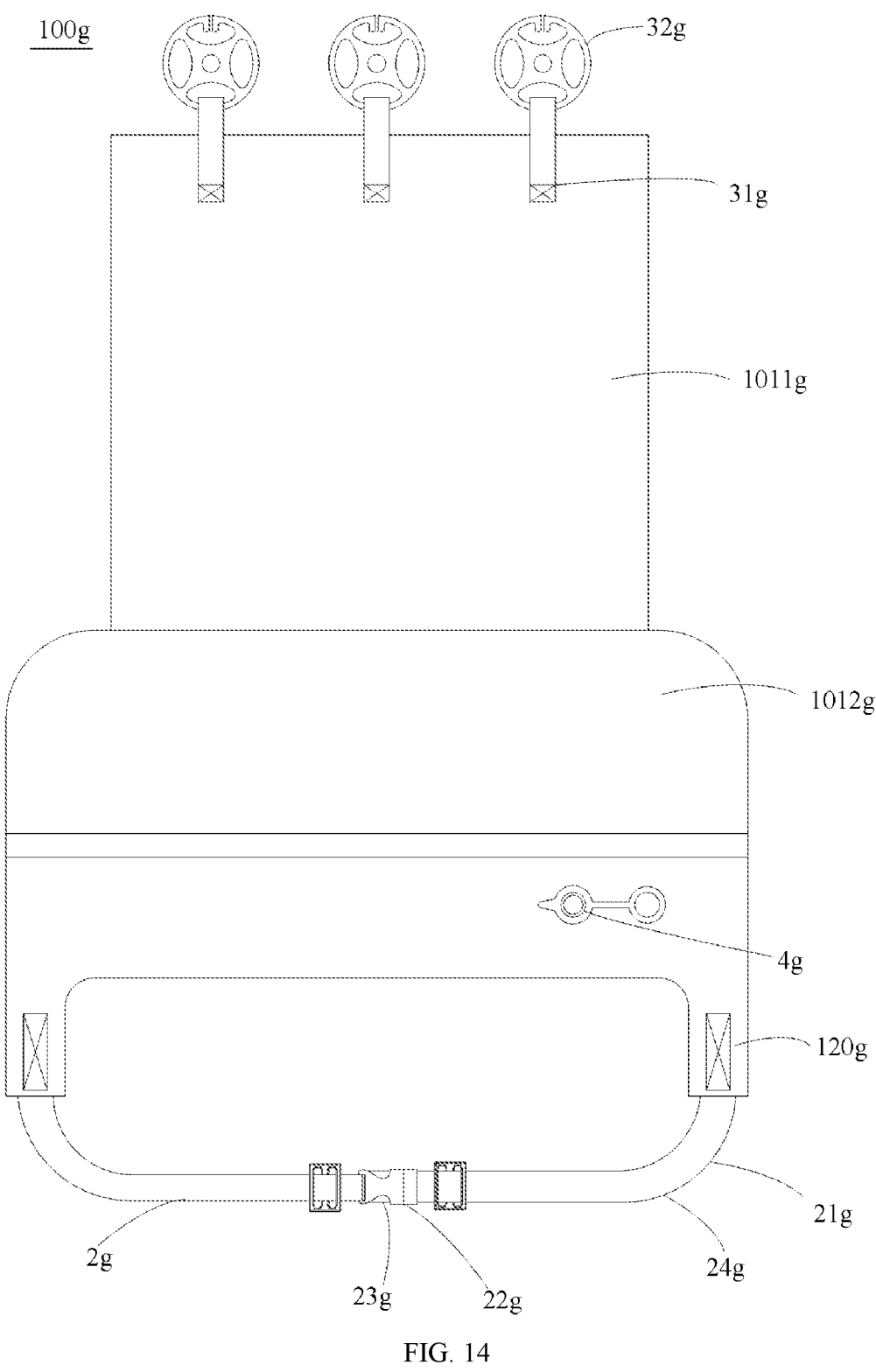
FIG. 14 is a structural diagram of a seat support according to a seventh embodiment of the present disclosure.

Please referring to FIG. 14, the present disclosure provides a seat support 100*g* according to a seventh embodiment. The seat support 100*g* is similar to the seat support 100*b* in structure, and the differences between the two at least include: the seat support 100*g* further includes a first sub support 1011*g* and a second sub support 1012*g* connected with the first sub support 1011*g*; the first sub support 1011*g* is arranged on the seat cushion 2011 of the back seat assembly 201, the second sub support 1012*g* is connected with the front seat assembly 202 and the first sub support 1011*g* to form the suspension portion 2012 for supporting the legs and feet; the second connecting member 3*g* includes at least one connecting belt 31*g* and at least one clamping part 32*g*; the connecting belt 31*g* is connected with the first sub support 1011*g* and extends out of the first sub support 1011*g*; the clamping part 32*g* is connected with the portion of the connecting belt 31*g* and extended out of the first sub support 1011*g*, the clamping part 32*g* may be round in shape or have other suitable shape; the clamping part 32*g* can be clamped in a gap between the seat cushion 2011 of the back seat assembly 201 and the backrest 2013 of the back seat assembly 201 to fix the first sub support 1011*g*; the seat support 100*g* further includes two opposite connecting belts 21*g*, a connecting part 22*g* (which may be a clamping seat) and a connecting part 23*g* (which may be a clamping head), the connecting part 22*g* and the connecting part 23*g* are respectively connected with the free ends of the two connecting belts 21*g*, the connecting belts 21*g*, the connecting part 22*g*, the connecting part 23*g* and the second sub support 1012*g* cooperatively form the connecting portion 24*g*, the connecting portion 24*g* sleeves on the front seat assembly 202; the second sub support 1012*g* is further provided with a gas charging and discharging member 4*g* to charge and discharge the second sub support 1012*g*.

The first sub support 1011*g* and the second sub support 1012*g* may be made of different or same materials. A width of the second sub support 1012*g* can be greater than that of the first sub support 1011*g* to support the user's legs well.

The second sub support 1012*g* is protruded with two connecting protrusions 120*g*, and two connection belts 21*g* are respectively connected with two connecting protrusions 120*g*.

Figure 15:
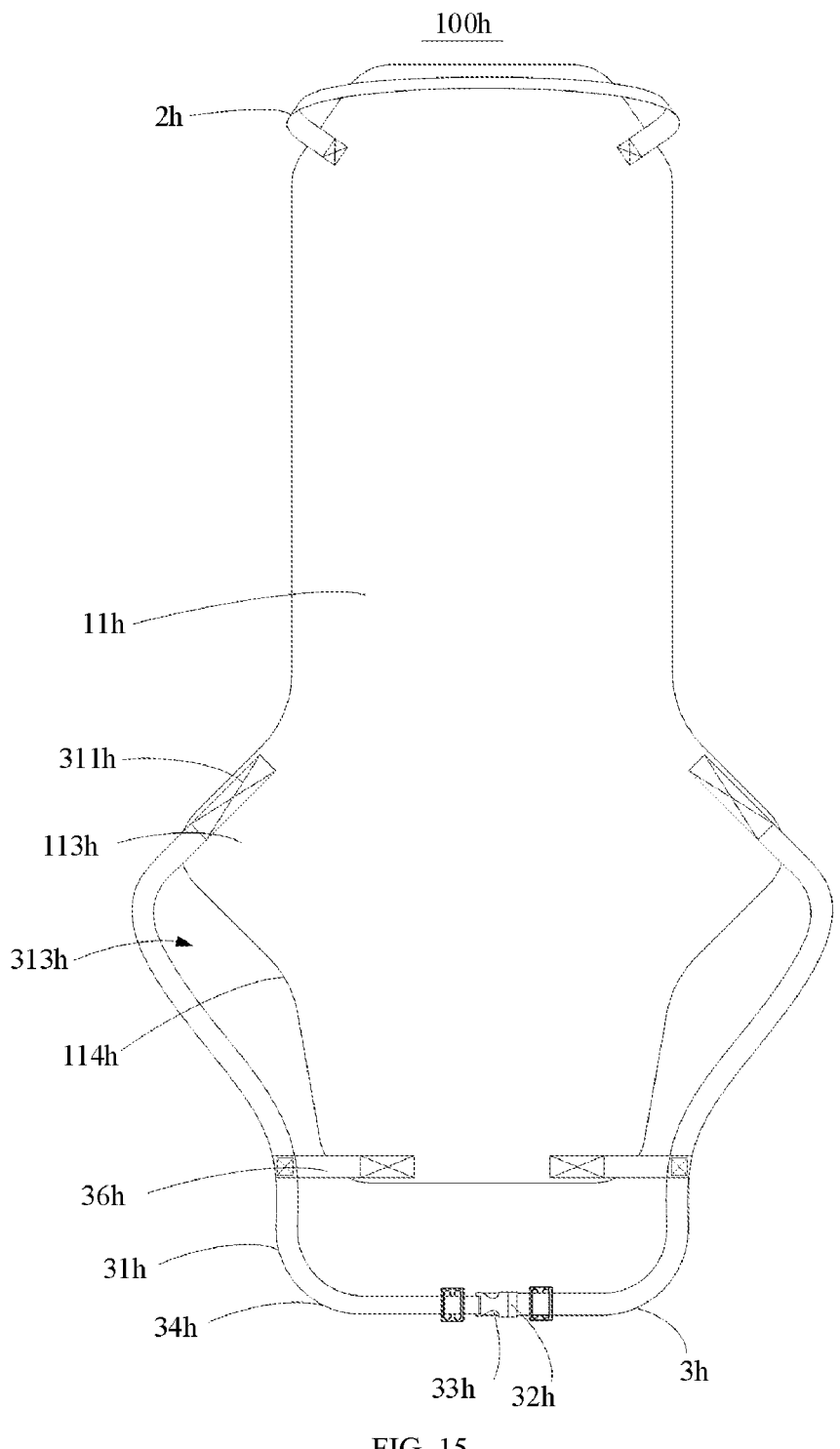
FIG. 15 is a structural diagram of a seat support according to an eight embodiment of the present disclosure.

Referring to FIG. 15, the present disclosure provides a seat support 100*h* according to an eighth embodiment. The seat support 100*h* is similar to the seat support 100*b* in structure, and the differences between the two at least include: the support portion 11*h* includes two convex portions 113*h* and two recessed portions 114*h*, the second connecting member 3*h* includes two connecting belts 31*h*, a connecting part 32*h* and a connecting part 33*h*, and the two connecting belts 31*h* are connected by the connecting part 32*h* and the connecting part 33*h*; the second connecting member 3*h* further includes two connecting belts 36*h* for connecting the connecting belt 31*h* with the support portion 11*h*; one end of the connecting belt 31*h* is connected with the convex portion 113*h*, the connecting belt 31*h* and the recessed portion 114 and the connecting belt 36*h* cooperatively form a connecting portion 313*h*, the safety belt 2016 can pass through the connecting portion 313*h*; the connecting belt 31*h*, the connecting belt 36*h*, the connecting part 32*h*, and the support portion 11*h* form the connecting portion 34*h* which can sleeve around the backrest 2013 of the back seat assembly 201.

The first connecting member 2*h* is similar with the first connecting member 2*b* in structure.

Figure 16:
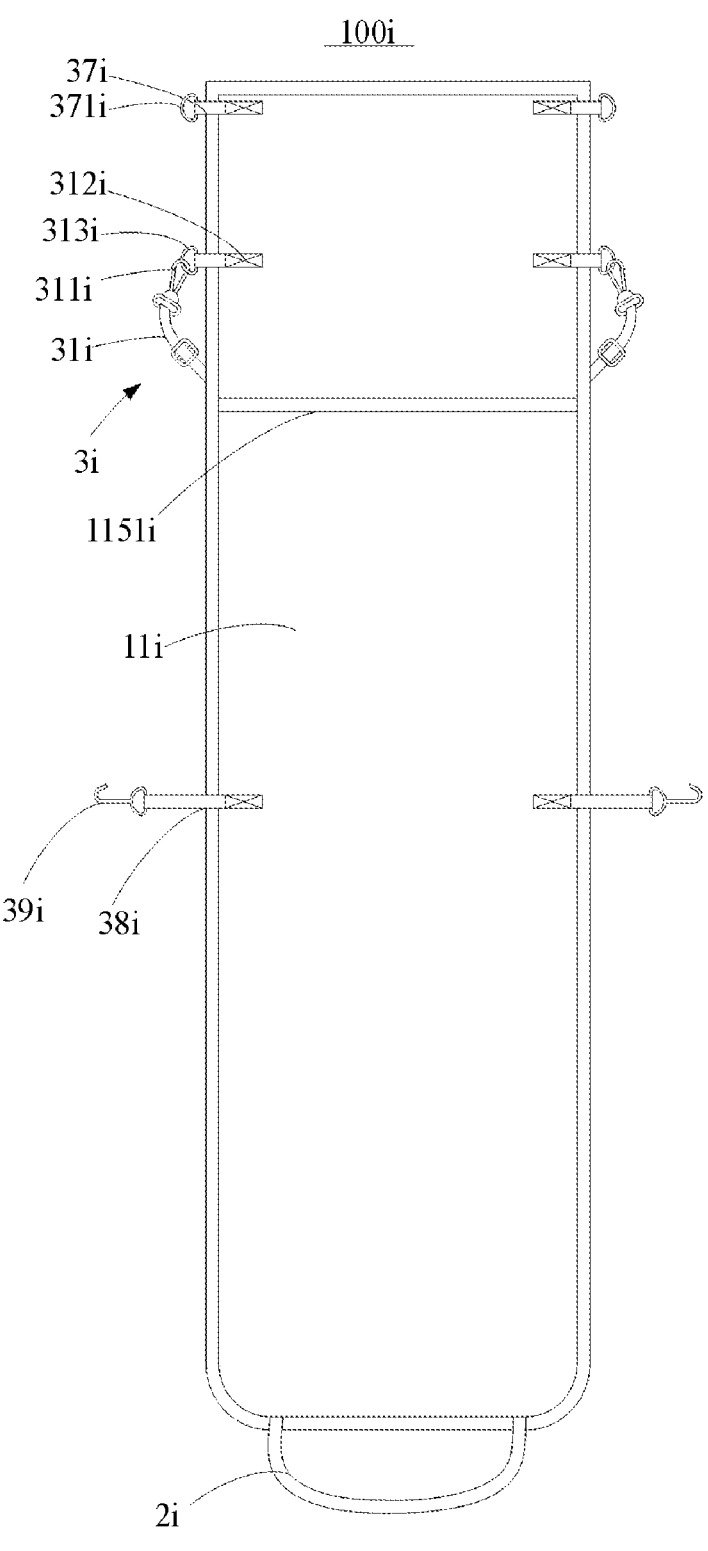
FIG. 16 is a structural diagram of a seat support according to a ninth embodiment of the present disclosure.

Please referring to FIG. 16, the present disclosure provides a seat support 100*i* according to a ninth embodiment. The seat support 100*i* is similar to the seat support 100*b* in structure, and the differences between the two at least include: the support portion 11*i* includes a sleeving portion 1151*i* which has a pocket configured to sleeve on a top portion of the backrest 2013 of the back seat assembly 201; the second connecting member 3*i* further includes two connecting belts 37*i* protruded from both ends of the support portion 11*i* respectively, a free end of the connecting belt 37*i* is provided with a connecting ring 371*i* configured to connect with a hook 2014 arranged on the backrest 2013 of the back seat assembly 201; the connecting belt 31*i* is positioned between the connecting belt 37*i* and an opening of the sleeving portion 1151*i*; the connecting belt 31*i* is provided with a clamping ring 311*i*, and the clamping ring 311*i* is detachably clamped with a connecting ring 313*i* connected with the connecting belt 312*i*, the connecting belt 312*i* is arranged between the connecting belt 37*i* and the connecting belt 31*i*; the second connecting member 3*i* further includes two connecting belts 38*i* and two connecting parts 39*i*, each connecting part 39*i* is connected with one connecting belt 38*i*, and the connecting part 39*i* can be clamp with the safety belt 2016 or the buckle 2015 of the vehicle.

It should be understood that, the second connecting member 3*i* sleeves on the backrest 2013 of the back seat assembly 201, the connecting parts 39*i* are connected with the safety belts 2016 or the buckles 2015 on the backrest 2013, the connecting belts 31*i* are connected with the front seat assembly 202, the sleeving portion 1151*i* may be used as a pocket. The first connecting member 2*i* can sleeve the front seat assembly 202.

The first connecting member 2*i* is similar with the first connecting member 2*b* in structure.

Figure 17:
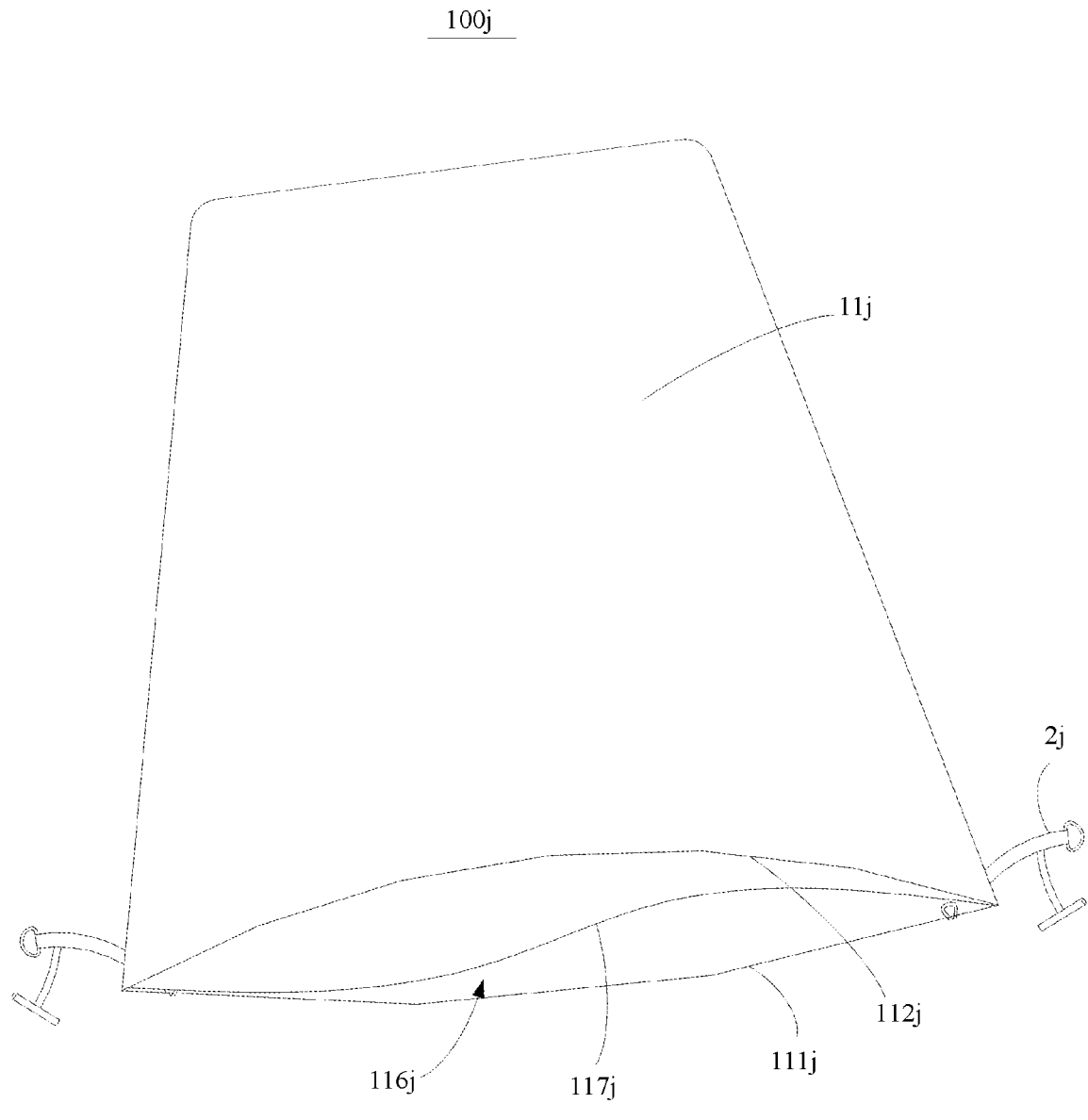
FIG. 17 is a structural diagram of a seat support according to a tenth embodiment of the present disclosure.
Figure 18:
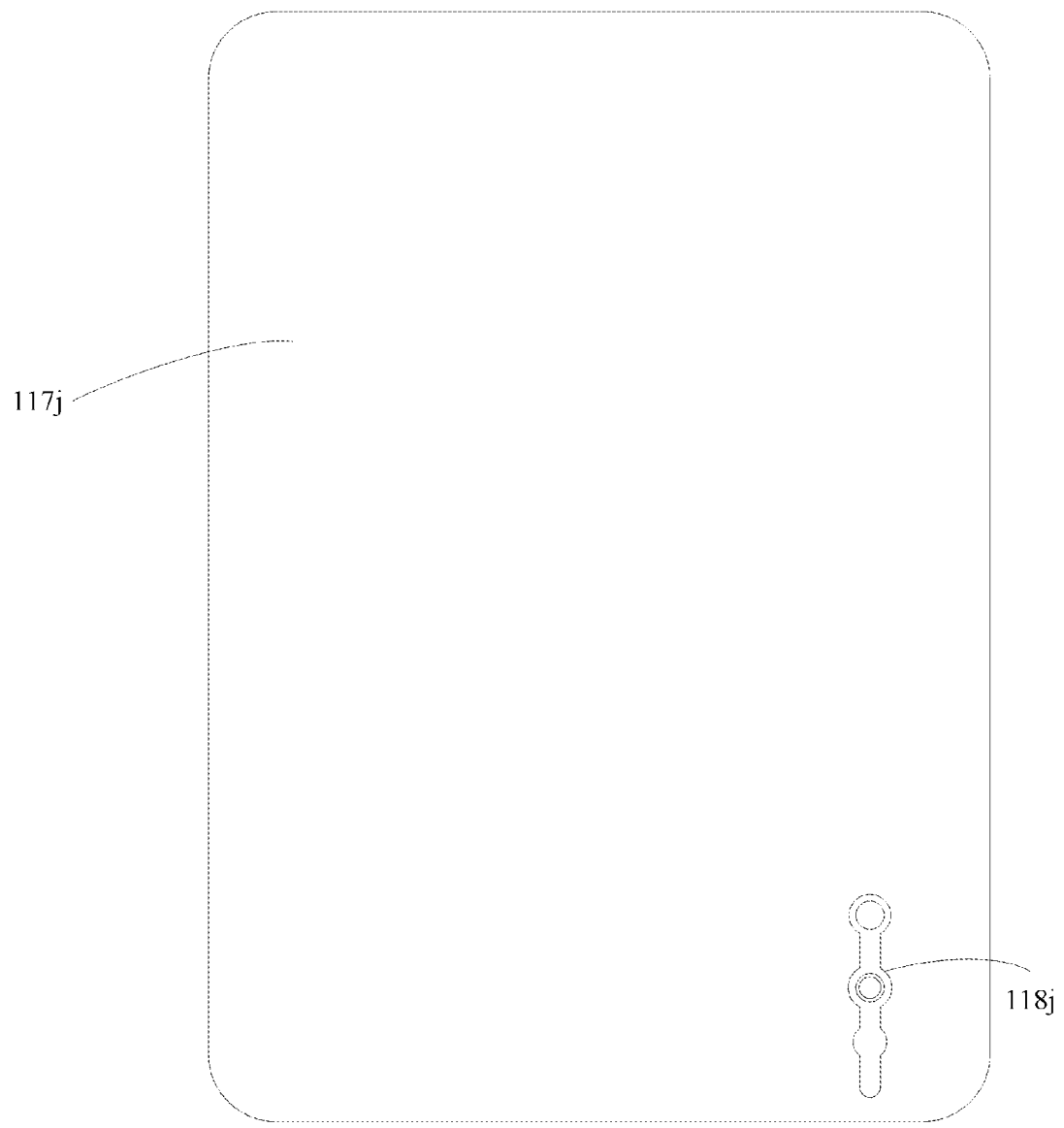
FIG. 18 is a structural diagram of an airbag of the seat support in FIG. 17.

Referring to FIGS. 17-18, the present disclosure provides a seat support 100*j* according to a tenth embodiment. The seat support 100*j* is similar to the seat support 100*b* in structure, and the differences between the two at least include: the seat support 100*j* does not include a second connecting member, and the first connecting member 2*j* is connected with the front seat assembly 202; the supporting member 11*i* has a receiving cavity 116*j*, the receiving cavity 116*j* is defined between inner layer 111*j* and the surface layer 112*j* and used to receive an airbag 117*j*, and the airbag 117*j* is provided with an air charging and discharging part 118*j* for inflating and deflating the airbag 117*j*.

Since the support portion 11*i* further includes an airbag 117*j*, when the support portion 11*i* and airbag 117*i* are placed on the seat cushion 2011 of the back seat assembly 201, the support portion 11*i* and airbag 117*i* can be stably placed on the seat cushion 2011 by their own gravity. In addition, user can further fix the support portion 11*i* and airbag 117*j* when sitting on the support portion 11*i* and airbag 117*j*.

Figure 19:
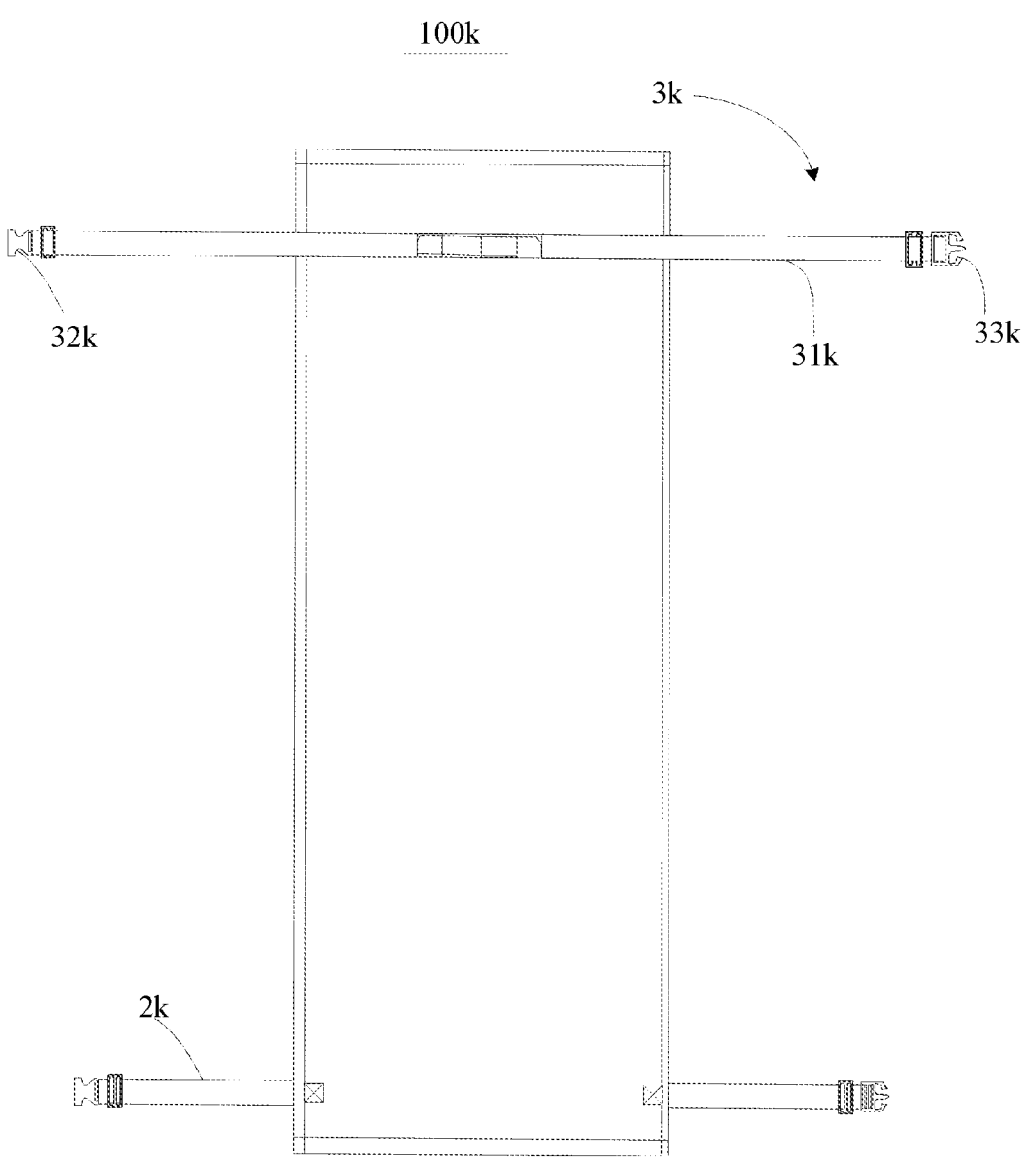
FIG. 19 is a structural diagram of a seat support according to an eleventh embodiment of the present disclosure.
Figure 20:
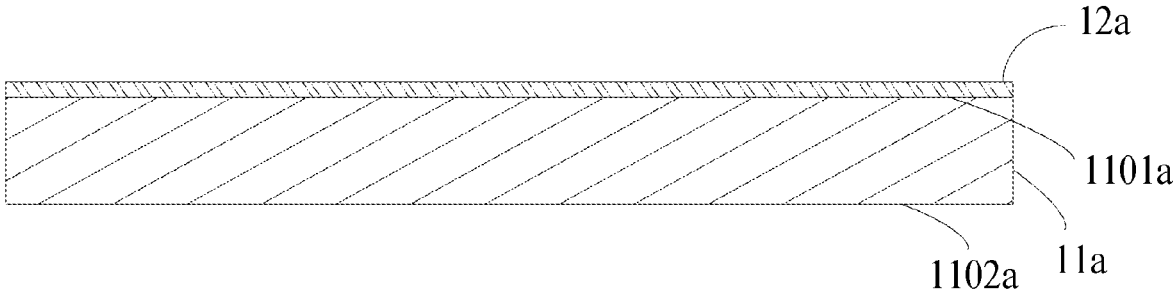
FIG. 20 is a structural diagram of an anti-skid portion and a support portion of the seat support in FIG. 1.
Figure 21:
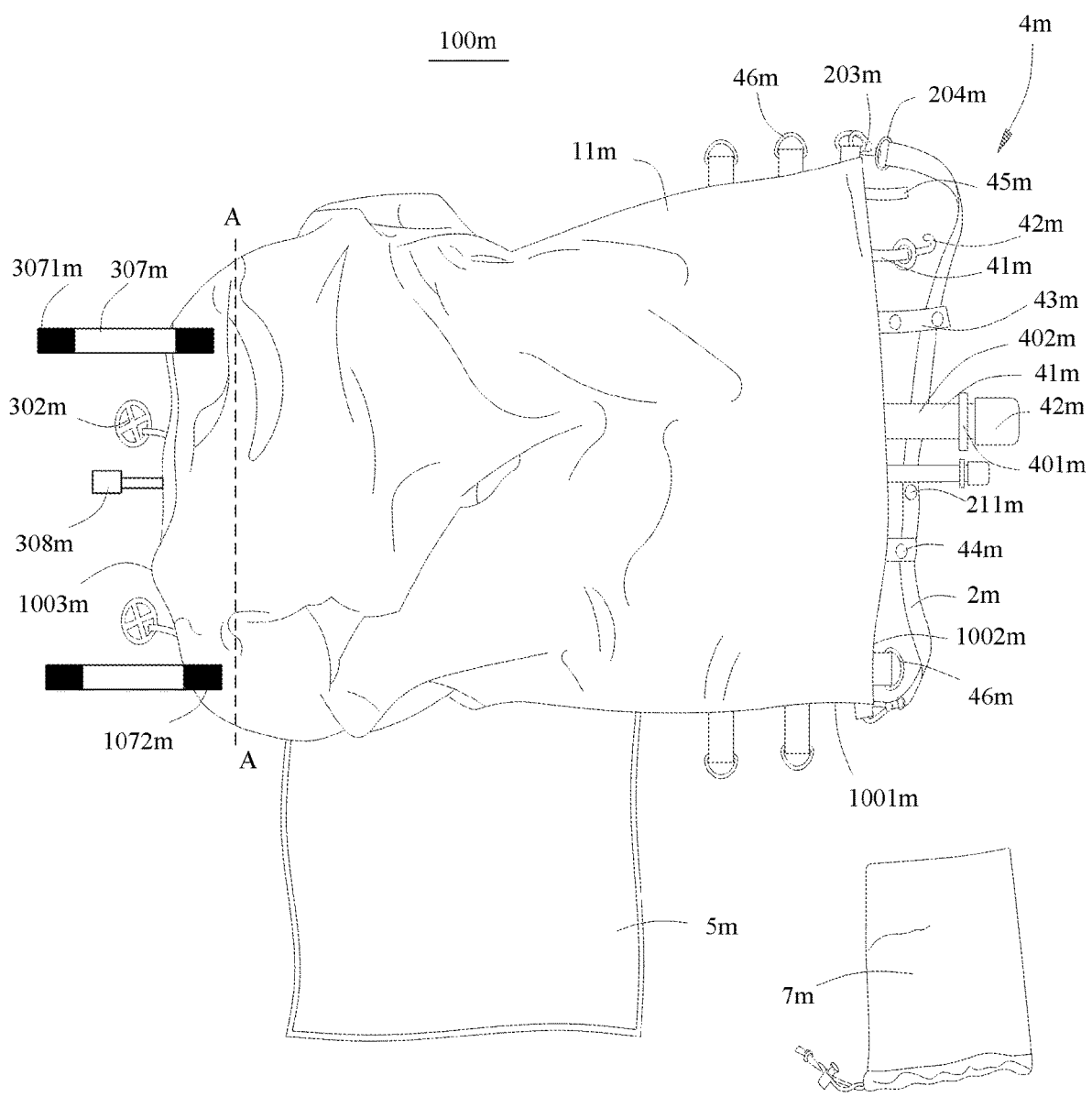
FIG. 21 is a structural diagram of a seat support according to a twelfth embodiment of the present disclosure.
Figure 22:
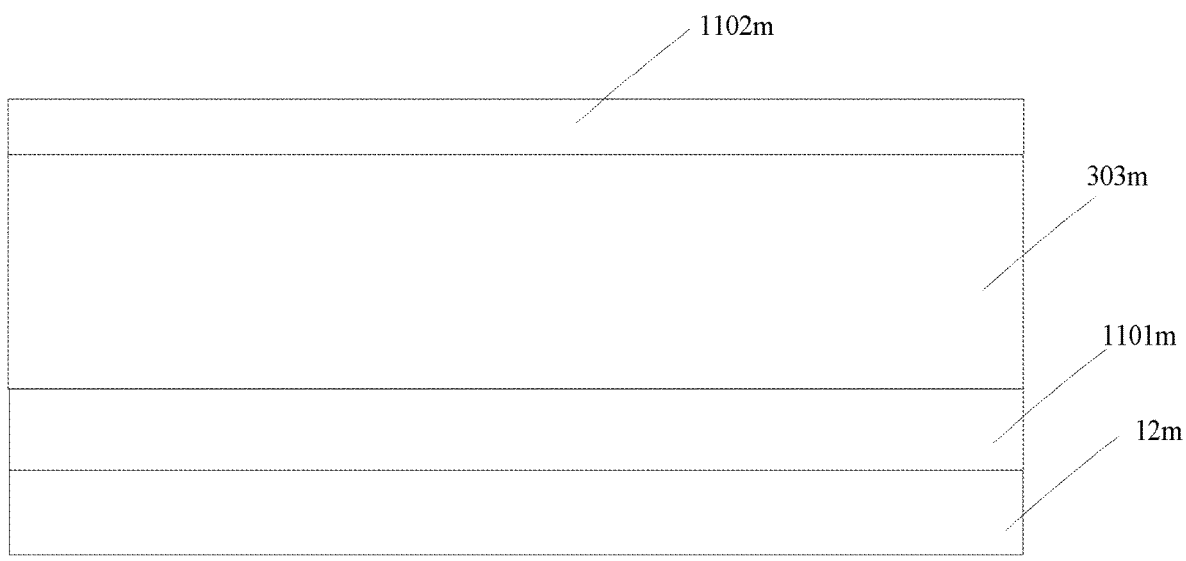
FIG. 22 is cross sectional diagram of the seat support along line A-A as shown in FIG. 21.
Figure 23:
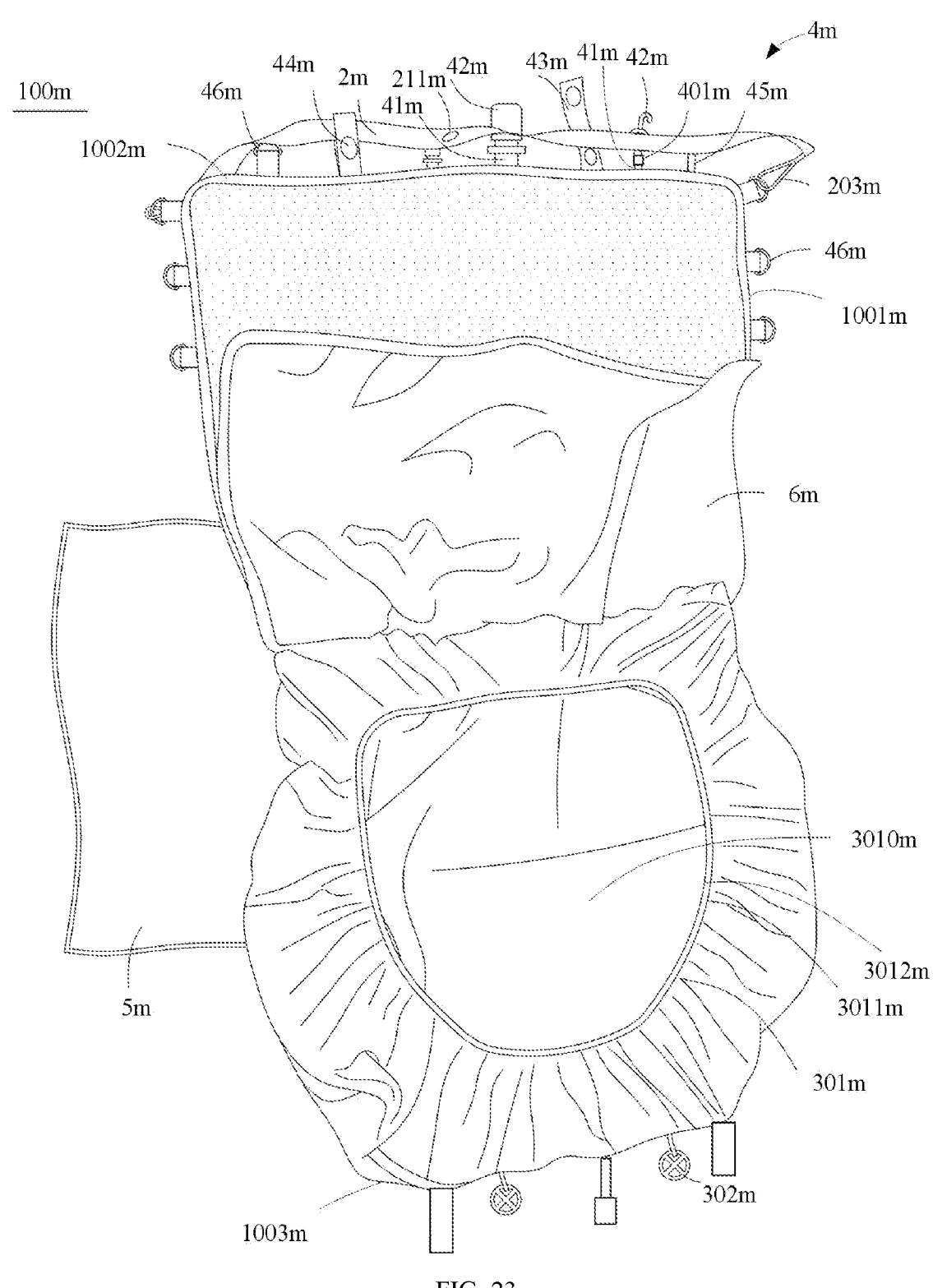
FIG. 23 is another structural diagram of the seat support in FIG. 21.
Figure 24:
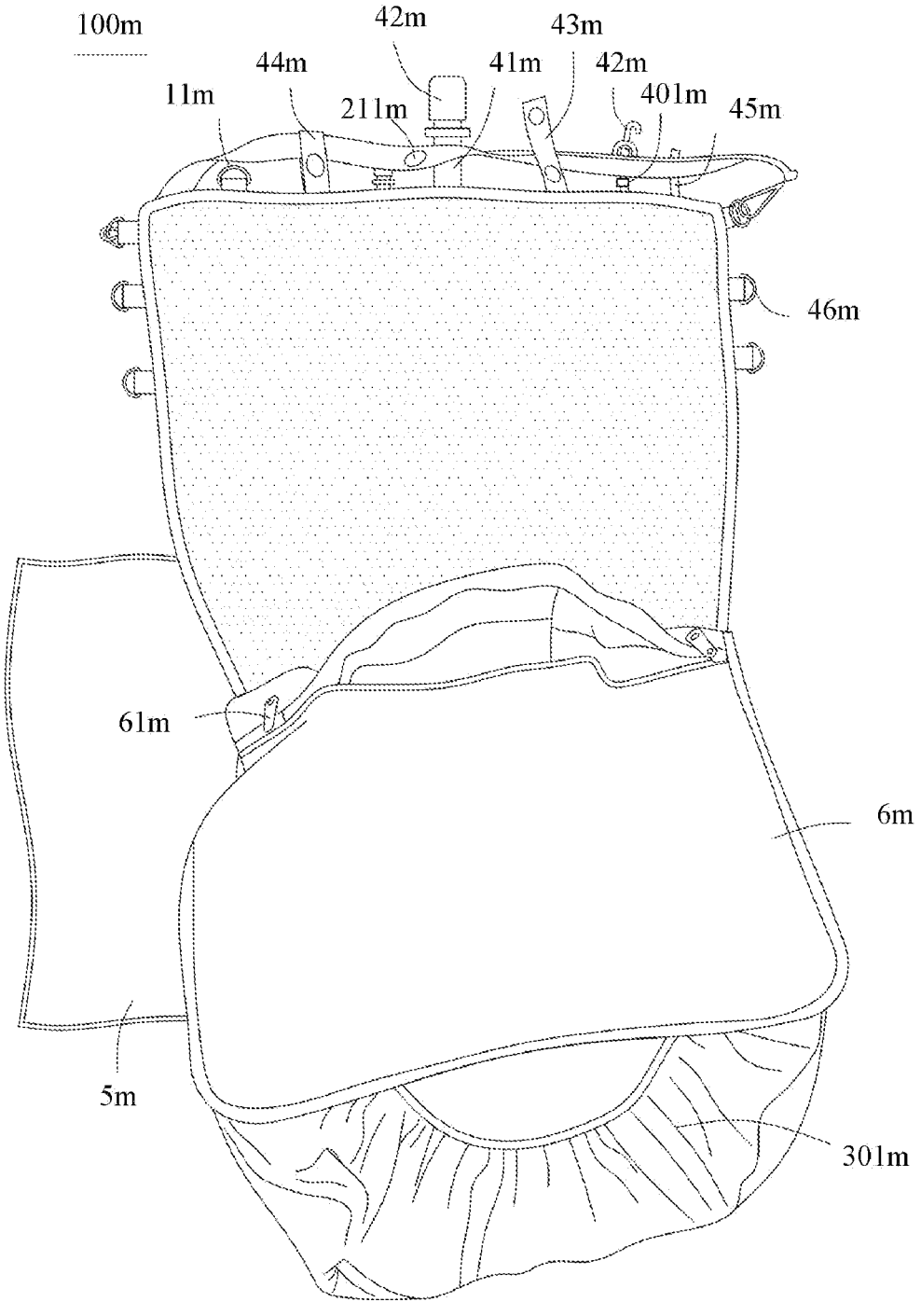
FIG. 24 is a further structural diagram of some parts of the seat support in FIG. 21.
Figure 25:
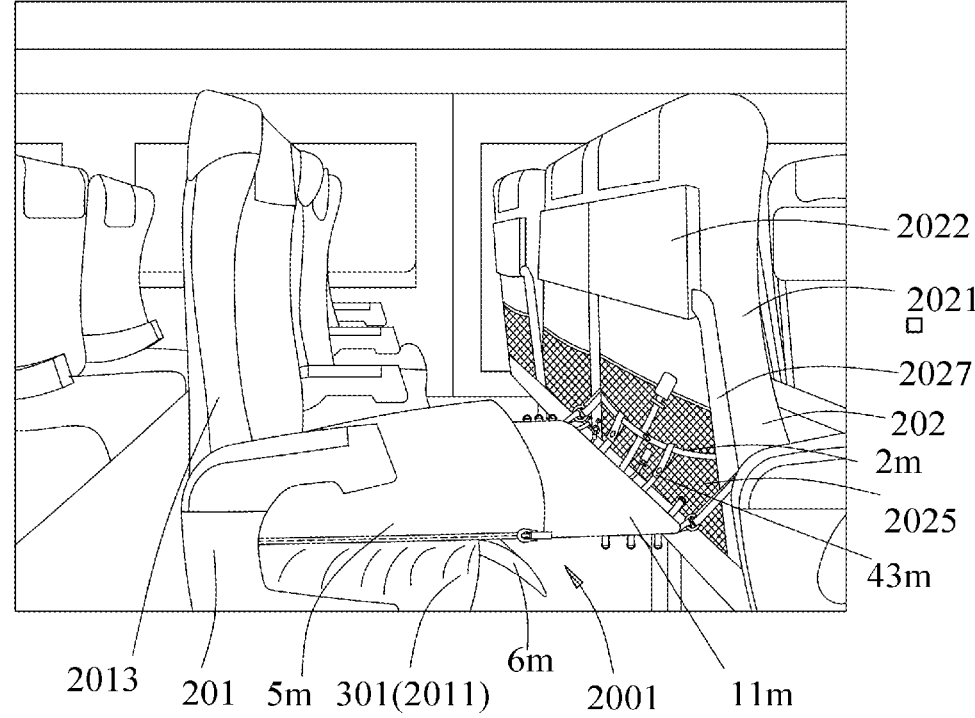
FIG. 25 is a structural diagram of the seat support in FIG. 21, and the seat support is fixed to the front seat assembly and the back seat assembly.

Referring to FIG. 19, the present disclosure provides a seat support 100*k* according to an eleventh embodiment. The seat support 100*k* is similar to the seat support 100*a* in structure, and the differences between the two at least include: the second fixing assembly 3*k* includes two connecting belts 31*k*, a connecting part 32*k*, and a connecting part 33*k*, the connecting belts 31*k* are connected with each other by the connecting part 32*k* and the connecting part 33*k*.

The first connecting member 2*k* is similar with the second connecting member 3*a* in structure.

Referring to FIGS. 21 to 27, the present disclosure provides a seat support 100*m* according to a twelfth embodiment. The seat support 100*m* is similar to any one of the above seat supports in structure. In one embodiment, the seat support 100*m* is similar to the seat support 100*a* in structure. It should be understood that, the seat support 100*m* can also be similar to the seat support 100*b* in structure.

The front seat assembly 202 further includes a storage bag 2025, and two support elements 2027 configured for rotatably connecting the table 2022 with the backrest 2021. The first connecting member 2*m* is connected with the front seat assembly 202 to connect the support portion 11*m* with the front seat assembly 202. In detail, the first connecting member 2*m* surrounds the backrest 2021, surrounds the support elements 2027, or surrounds the table 2022, to connect the support portion 11*m* with the front seat assembly 202.

The seat support 100*m* further includes an adjusting assembly 4*m* which is configured to connect the support portion 11*m* with the front seat assembly 202 at a portion of the support portion 11*m* to lift the support portion 11*m* and the prevent the support portion 100*m* from sagging. The adjusting assembly 4*m* can keep the support portion 11*m* substantially at a horizontal position or substantially at a position above the horizontal position, to prevent the support portion 11*m* from sagging. The adjusting assembly 4*m* includes a connecting belt 41*m* sewn or glued with the support portion 11*m*, and at least one connecting part 42*m*. One end of the connecting part 42*m* is connected with the connecting belt 41*m*. The other end of the connecting part 42*m* is connected with the backrest 2021, an edge of the storage bag 2025, the table 2022, or the support element 2027 of the front seat assembly 202, for preventing the support portion 11*m* from sagging. The connecting belt 41*m* is an elastic belt or an inelastic belt, specifically, the connecting belt 41*m* is a webbing belt, a plastic belt, a rubber belt, or the like. The connecting part 42*m* is a hook, a clamp, or the like. The connecting belt 41*m* is provided with an adjusting buckle 401*m* configured for adjusting a length of the connecting belt 41*m*. A portion 402*m* of the connecting belt 41*m* can be glued or sewn with the connecting member 2*m*, or the portion 402*m* of the connecting belt 41*m* is not connected with the connecting member 2*m*. The connecting member 2*m* defines a through hole 211*m*, the connecting belt 41*m* can connect with the front seat assembly 202 or the first connecting member 2*m* after passing through the through hole 211*m*.

The adjusting assembly 4*m* further include a connecting belt 43*m* sewn or glued with the support portion 11*m*, and at least two connecting parts 44*m* arranged on the connecting belt 43*m* at intervals. One of the at least two connecting parts 44*m* is connected with another one of the at least two connecting parts 44*m* according to a gap 2001 between the front seat assembly 202 and the back seat assembly 201 for preventing the support portion 11*m* from sagging after the connecting belt 43*m* surrounds the first connecting member 2*m* or the support element 2027. The connecting belt 43*m* is an elastic belt or an inelastic belt, specifically, the connecting belt 43*m* is a webbing belt, a plastic belt, a rubber belt, or the like. The connecting part 44*m* is a hook, a clamp, a hook and loop fastener, a female buckle, a groove, a hole, or a male buckle, and two of the connecting parts 44*m* can be connected with each other. After the connecting belt 43*m* surrounds the first connecting member 2*m* or the support element 2027, two connecting parts 44*m* are connected with each other to connect the support portion 11*m* with the first connecting member 2*m* or the support element 2027 according to the gap 2001 between the front seat assembly 202 and the back seat assembly 201, for preventing the support portion 11*m* from sagging.

The adjusting assembly further 4*m* includes a connecting strip 45*m*, the connecting strip 45*m* can be a rope, a chain, or a belt with hook and loop fasteners. One end of the connecting strip 45*m* is connected with the support portion 11*m*, and another end of the connecting strip 45*m* is connected with the support element 2027 or the first connecting member 2*m* for preventing the support portion 11*m* from sagging. In one embodiment, the connecting strip 45*m* is tied with the support element 2027 or the first connecting member 2*m*.

The adjusting assembly 4*m* further includes a plurality of connecting parts 46*m* arranged on the support portion 11*m* at intervals, the connecting parts 46*m* can be connected with the support portion 11*m* by connecting belts (not labeled). Two adjacent connecting parts 46*m* can contact with each other or can be spaced apart from each other. A first distance between each two adjacent connecting parts 46*m* is about 0-90 cm, preferably 5-10 cm. In detail, the first distance is 1 cm, 2 cm, 3 cm, 4 cm, 5 cm, 10 cm, 20 cm, 30 cm, 40 cm, 50 cm, 60 cm, 70 cm, 80 cm, or 90 cm. The support portion 11$m$ includes two side edges 1001$m$, a front edge 1002$m$, and a rear edge 1003$m$, the side edges 1001$m$ are substantially parallel with an axis direction of the support portion 11$m$. The connecting parts 46$m$ are arranged on the side edges 1001$m$ or the front edge 1002$m$ at intervals. Specifically, the front portions of the side edges 1001$m$ are provided with the connecting parts 46$m$, two ends of the front edge 1002$m$ are provided with connecting parts 46$m$, users can connect each end of the first connecting member 2$m$ with one of the connecting parts 46$m$ according to the gap 2001 between the front seat assembly 202 and the back seat assembly 201. In this way, the support portion 11$m$ can be remained at a substantially horizontal position or remained at a position substantially above the horizontal position. In one embodiment, the first connecting member 2$m$ includes two connecting parts 203$m$, the connecting parts 203$m$ are connected with two ends of the first connecting member 2$m$ respectively, the connecting parts 203$m$ are connected with suitable connecting parts 46$m$ according to the gap 2001 between the front seat assembly 202 and the back seat assembly 201 for preventing the support portion 11$m$ from sagging. The connecting part 203$m$ is a hook clasp, a hook buckle, a clamp, a hook and loop fastener, a rope, a groove defined in the first connecting member 2$m$, a hole defined in the first connecting member 2$m$, or a female buckle. The connecting part 46$m$ is a hook, a hook buckle, a clamp, a hook and loop fastener, a rope, a groove defined in the support portion 11$m$, a hole defined in the support portion 11$m$, or a male buckle. The first connecting member 2$m$ further includes two connecting parts 204$m$ configured to connect the connecting part 203$m$ with the ends of the first connecting member 2$m$. The connecting part 204$m$ is a connecting ring, a clamp, or a hook. In one embodiment, the connecting part 203$m$ and the connecting part 204 are two independent components, or the connecting part 203$m$ and the connecting part 204$m$ are integratedly formed.

The front edge 1002$m$ is arranged with some elements including at least one connecting belt 41$m$, at least one connecting belt 43$m$, at least one connecting strip 45$m$, and at least one connecting part 46$m$, each two adjacent elements has a second distance of about 0-60 cm, preferably 3-10 cm. In detail, the second distance is about 1 cm, 2 cm, 3 cm, 4 cm, 5 cm, 10 cm, 20 cm, 30 cm, 40 cm, 50 cm or 60 cm. Two adjacent elements can contact with each other or can be spaced apart from each other.

The seat support 100$m$ further includes a fixing assembly connected with the support portion 11$m$ or received in the support portion 11$m$. A gap 2010 is defined between the backrest 2013 and the seat cushion 2011 of the back seat assembly 201, the fixing assembly is at least partially received in the gap 2010 to fix the support portion 11$m$. The fixing assembly includes a wrapping member 301$m$ connected with a lower surface of the support portion 11$m$, the wrapping member 301$m$ may be a slipcover which covers or surrounds the seat cushion 2011 of the back seat assembly 201 and is partially received in the gap 2010 between the backrest 2013 and the seat cushion 2011 of the back seat assembly 201 to fix the support portion 11$m$. In detail, the wrapping member 301$m$ surrounds the side surfaces of the seat cushion 2011 and fixed at the bottom surface of the seat cushion 2011, the wrapping member 301$m$ includes a through hole 3010$m$ and an edge 3011$m$, the edge 3011$m$ is provided with an elastic band 3012$m$, as such the wrapping member 301$m$ can fix with the bottom surface of the seat cushion 2011. In one embodiment, the elastic band 3012$m$ is arranged along the edge 3011$m$, and all portions of the edge 3011$m$ are all provided with the elastic band 3012. In another embodiment, only a portion of the edge 3011$m$ is provided with the elastic band 3012$m$, specifically, the portion of the edge 3011$m$ corresponding to the rear side of the seat cushion 2011 is provided with the elastic band 3012$m$. In a further embodiment, several separated portions of the edges 3011 are provided with the elastic band 3012$m$, and at least one of the several separated portions corresponding to the rear side of the seat cushion 2011 is provided with the elastic band 3012$m$.

The fixing assembly further includes at least one clamping member 302$m$ arranged at the rear edge 1003$m$ of the support portion 11$m$ connected with the support portion 11$m$ by a belt. The clamping member 302$m$ is received or clamped in the gap 2010 between the backrest 2013 and the seat cushion 2011 of the back seat assembly 201 to fix the support portion 11$m$. The clamping member 302$m$ is round in shape, or the clamping member 302$m$ can have another shapes. In another embodiment, a belt 307$m$ with hook and loop fasteners can also be regarded as the clamping member, the belt 307$m$ with hook and loop fasteners can be received in the gap 2010 to fix the support portion 11$m$, and the belt 307$m$ with hook and loop fasteners includes a hook portion 3071$m$ and a loop portion 3072$m$, a ring is formed when the hook portion 3071$m$ is connected with the loop portion 3072$m$, the safety belt 2016 can pass through the ring to connect the support portion 11$m$ with the back seat assembly 201. In a further embodiment, a clamp 308$m$ can also be regarded as the clamping member, and the clamp 308$m$ is connected with the support portion 11$m$ by a belt.

The fixing assembly further includes an inflatable member 303$m$, a cushion, or a pillow which can be arranged in a portion of the support portion 11$m$ corresponding to the seat cushion 2011 of the back seat assembly 201. The portion of the support portion 11$m$ for receiving the inflatable member 303$m$, the cushion, or the pillow can be separated from the other portion of the support portion 11$m$ by seaming the top surface and the bottom surface together along a connecting line of the two portions. It should be understood that, the cushion, the pillow can also be labeled as 303$m$. A portion of the inflatable member, the cushion, or the pillow can be inserted in the gap 2010 between the backrest 2013 and the seat cushion 2011 of the back seat assembly 201 to fix the support portion 11$m$. The pillow may be an ice pillow for providing a cool feeling. It should be understood that, the inflatable member, the cushion, or the pillow can also be placed in other positions of the support portion 11$m$. In one embodiment, the inflatable member may substantially have the shape same with the support portion 11$m$, that is, the inflatable member takes up all an interior space of the support portion 11$m$. Obviously, the cushion or the pillow can also have the shape same with the support portion 11$m$ and take up all an interior space of the support portion 11$m$.

Figure 26:
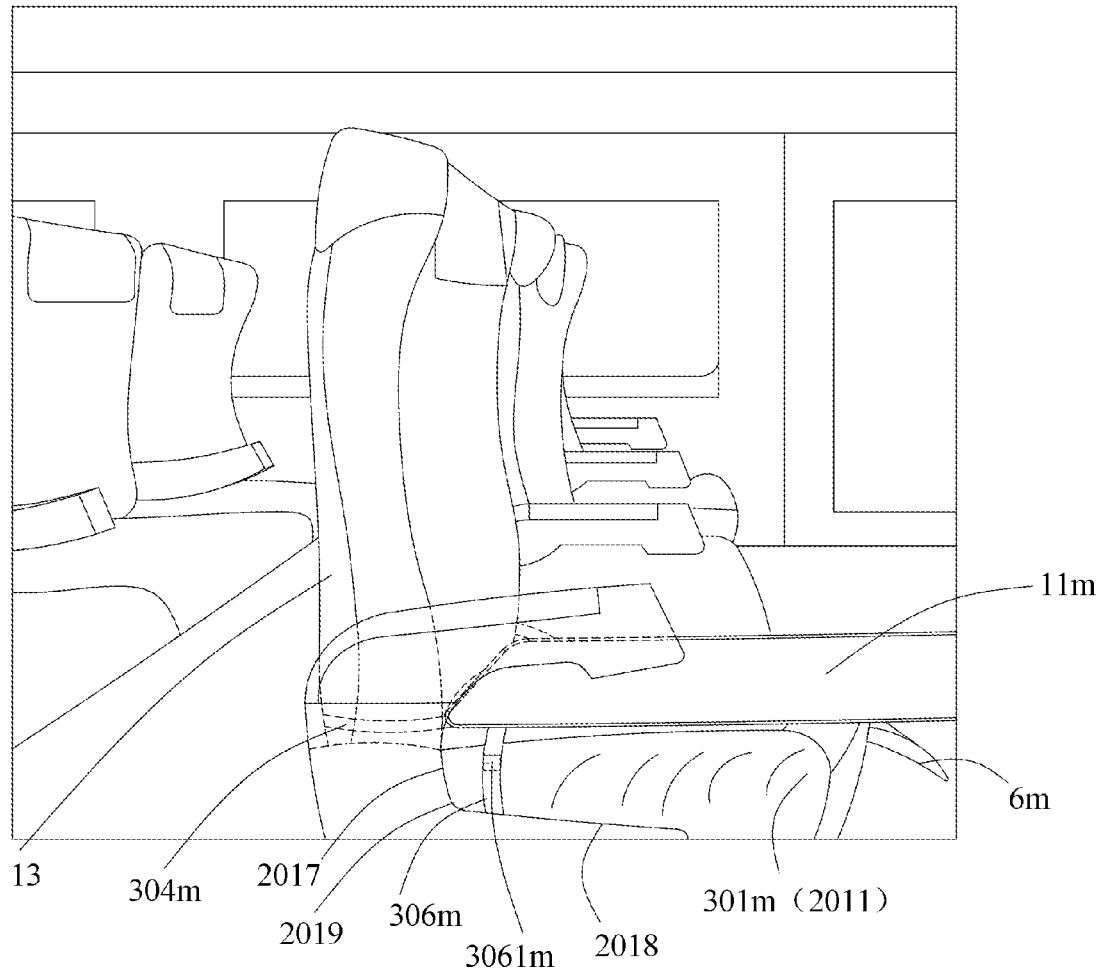
FIG. 26 is a structural diagram of a seat support according to another embodiment, the seat support is fixed to the back seat assembly.

As shown in FIG. 26, the fixing assembly further includes at least one belt which can sleeved on the backrest 2013 or the seat cushion 2011 of the back seat assembly 201. In one embodiment, the at least one belt includes an elastic belt 304$m$ and a non-elastic belt 306$m$, the non-elastic belt 306$m$ has a connecting structure 3061$m$, the connecting structure 3061$m$ can be a clamping structure, and the non-elastic belt 306$m$ has the same structure as the first connecting member or the second connecting member recited in the first to eleventh embodiments. In one embodiment, the elastic belt 304$m$ or the non-elastic belt 306$m$ can sleeve on the backrest 2013, or can be received in the gap 2010 and surrounds a rear surface 2017 of the seat cushion 2011, or can sleeve on the side surface 2018 of the seat cushion 2011 after passing through the gap 2010, or can be received in the gap 2010 and surrounds a connecting portion 2019 of the rear surface 2017 and the side surface 2018.

Figure 27:
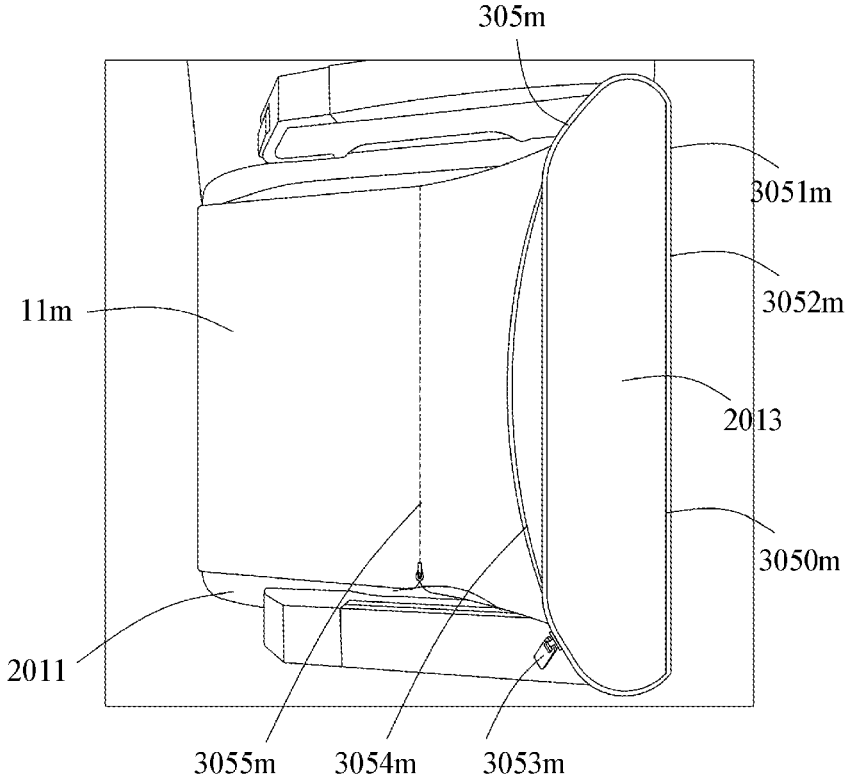
FIG. 27 is a structural diagram of a seat support according to a further embodiment, the seat support is fixed to the back seat assembly.
Figure 28:
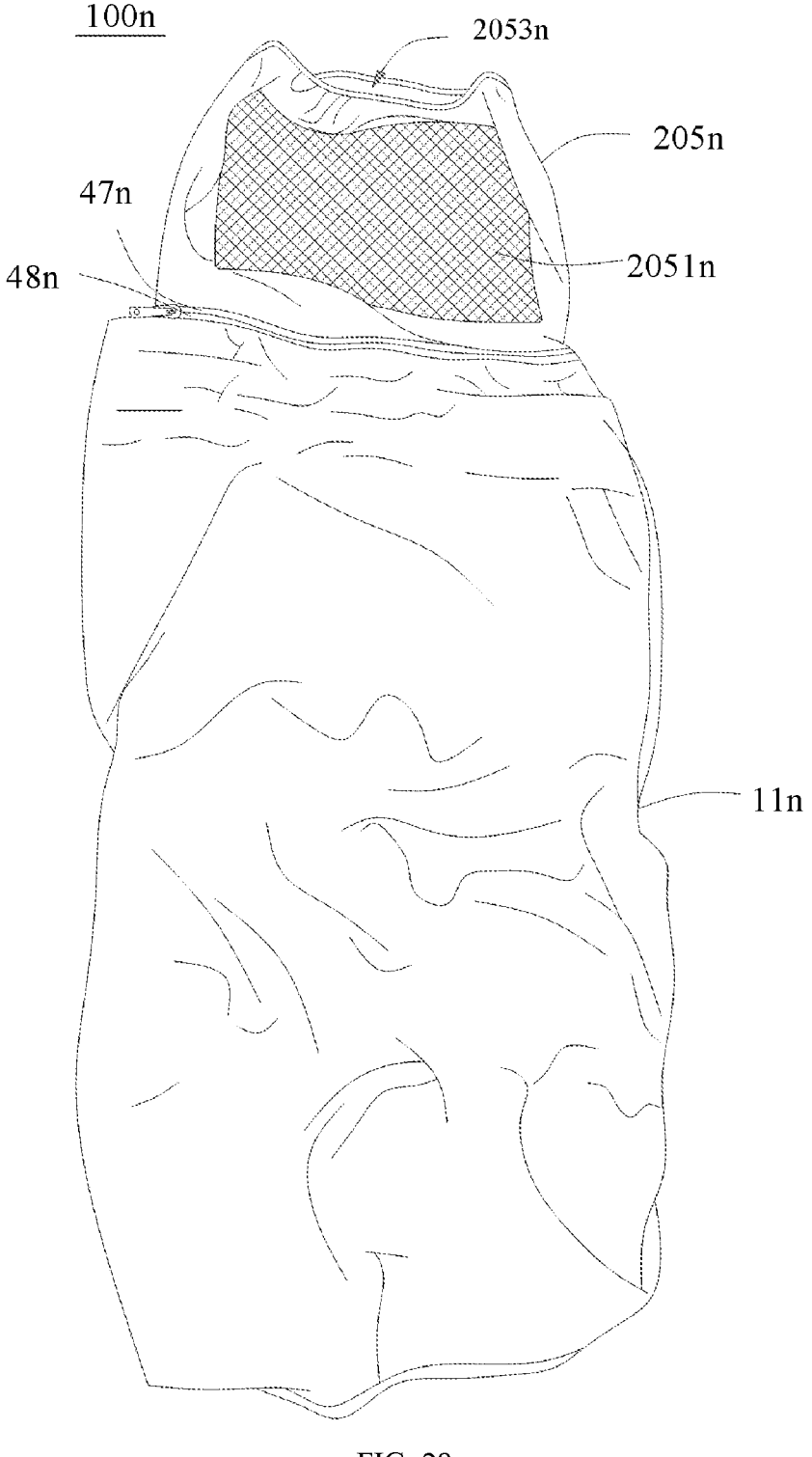
FIG. 28 is a structural diagram of a seat support according to a thirteenth embodiment of the present disclosure.
Figure 29:
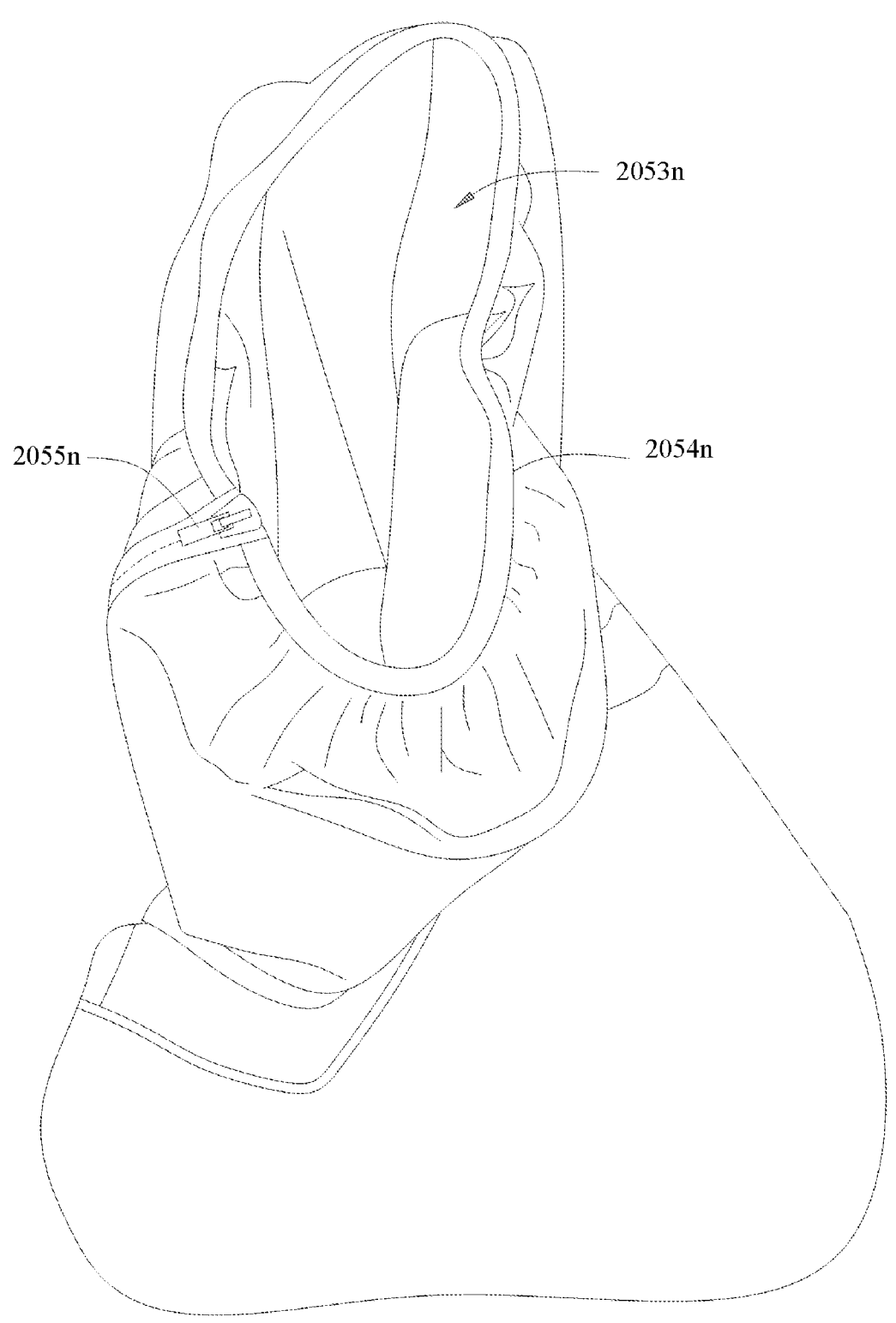
FIG. 29 is another structural diagram of the seat support in FIG. 26.
Figure 30:
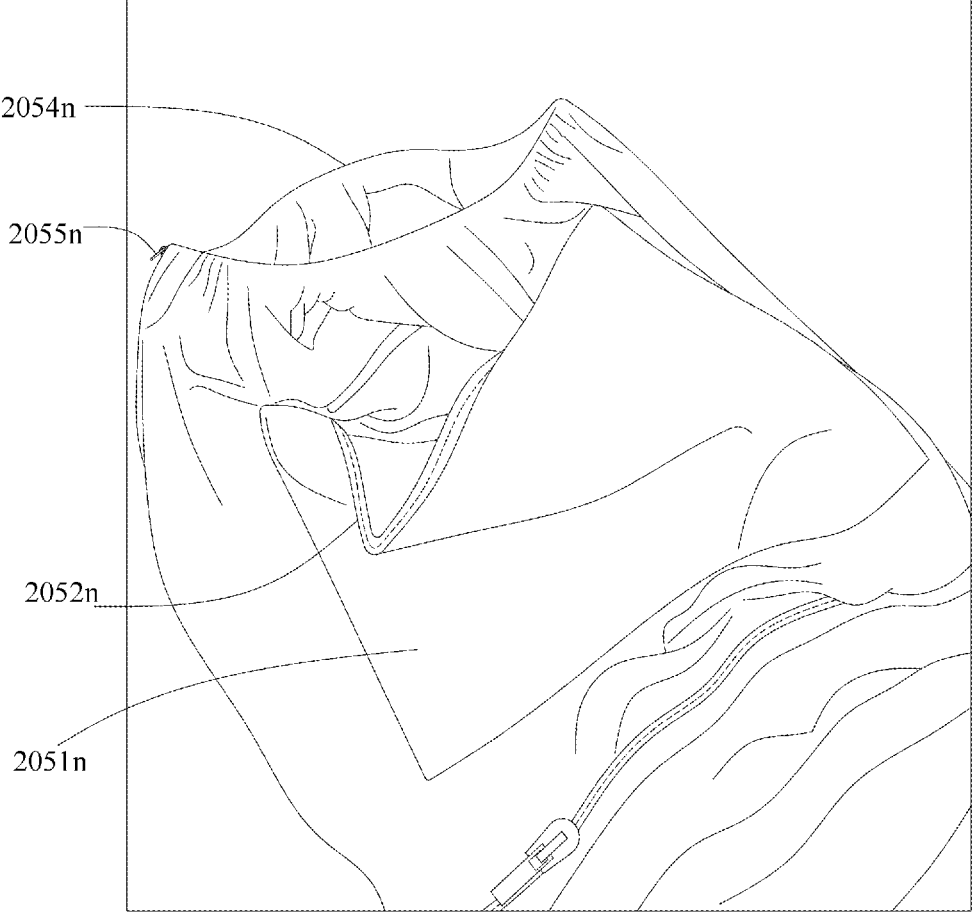
FIG. 30 is a structural diagram of a portion of the seat support in FIG. 26.
Figure 31:
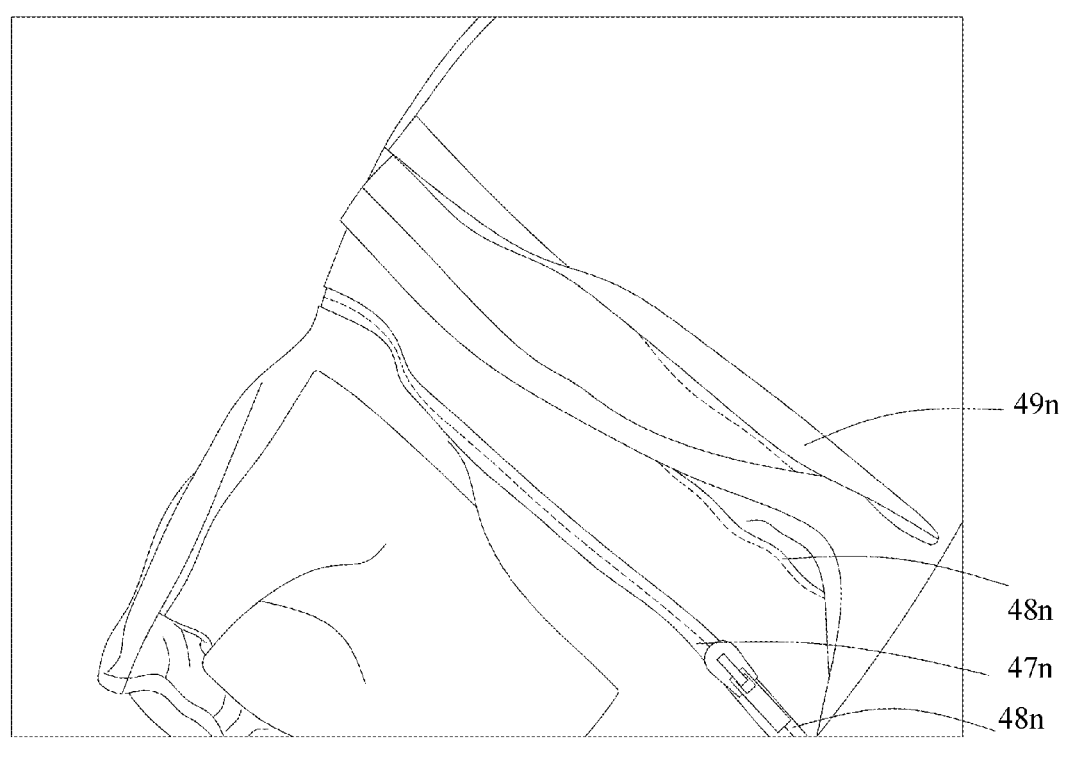
FIG. 31 is another structural diagram of the portion of the seat support in FIG. 26.
Figure 32:
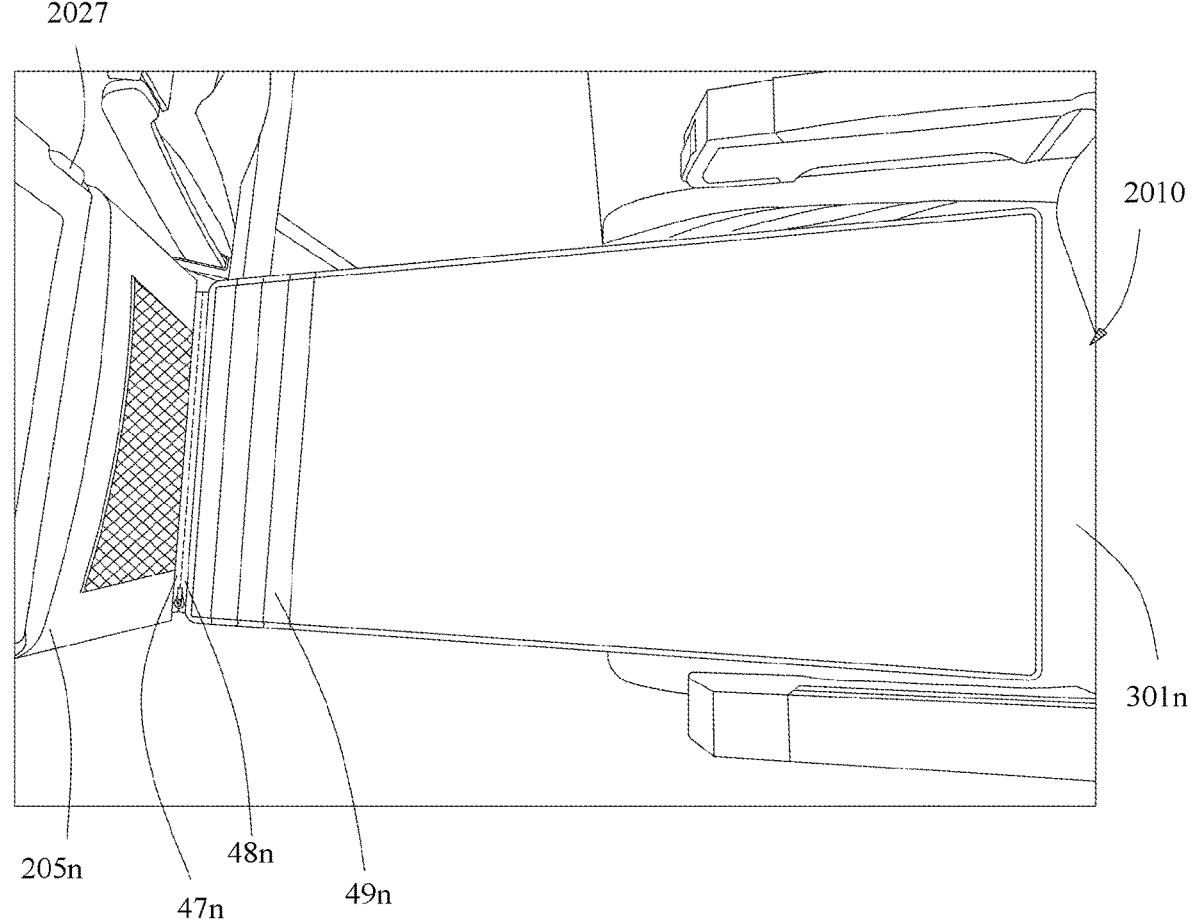
FIG. 32 is a structural diagram of the seat support in FIG. 26, and the seat support is fixed to the front seat assembly and the back seat assembly.

As shown in FIG. 27, the fixing assembly further includes a sleeve 305*m* which can surround the backrest 2013 of the back seat assembly 201. The sleeve 305*m* can surround all or part of the backrest 2013 of the back seat assembly 201, the shape of the sleeve 305*m* can be designed according to actual needs. The sleeve 305*m* has two opposite through holes 3051*m* and an inner space 3050*m* for receiving the backrest 2013, an edge of one of the through holes 3051*m* is connected with the support portion 11*m*, and a periphery of each of the through holes 3051*m* is provided with an elastic part 3052*m*. In detail, a portion of the edge of the through hole 3051*m* which is not connected with the support portion 11*n* is provided with the elastic part 3052*m*. The sleeve 305*m* is further provided with a zipper 3053*m* parallel with the axis of the backrest 2013 when the sleeve 305*m* surrounds the backrest 2013. User can surround the sleeve 305*m* on the backrest 2013 easily by the zipper 3053*n*. The sleeve 305*m* has a bag 3054*m* for receiving the belongings of the user. In one embodiment, the sleeve 305*m* is integratedly with the support portion 11*m*. In another embodiment, the sleeve 305*m* and the support portion 11*m* are two independent components, and connected with each other by a zipper 3055*m*.

The seat support 100*m* further includes a blanket 5*m* connected with the support portion 11*m*. The blanket 5*m* may be detachably or fixedly connected with the side edge 1001*m*, the front edge 1002*m* or the rear edge 1003*m* of the support portion 11*m*. The blanket 5*m* can be connected with the side edge 1001*m* by a zipper. The blanket 5*m* can keep the child from catching a cold.

The seat support 100*m* further includes a bag 6*m* connected with the lower surface of the support portion 11*m*, the bag 6*m* is configured to receive belongings of user, and the bag 6*m* is also configured to receive the support portion 11*m*, the first connecting member 2*m*, the adjusting assembly 4*m*, the blanket 5*m*, the fixing assembly when the support portion 11*m* is not connected with the front seat assembly 202. In detail, a portion of the support portion 11*m* which is not arranged on the seat cushion 2011 can be received in the bag 6*m* when the support portion 11*m* is not connected with the front seat assembly 202. The bag 6*m* has an opening and a receiving space, and the bag 6*m* can be opened or closed by a zipper 61*m*. The bag 6*m* is substantially arranged at a middle portion of the lower surface of the support portion 11*m*, and perpendicular to an axis direction of the support portion 11*m*. When the seat support 100*m* is in use, the bag 6*m* rests on the seat cushion 2011 of the back seat assembly 201. In another embodiment, the bag 6*m* can also be arranged at the side edge 1001*m* of the support portion 11*m*.

The seat support 100*m* further includes a buggy bag 7*m*, the support portion 11*m*, the connecting member 2*m*, the fixing assembly, the blanket 5*m*, the bag 6*m* can be received in the buggy bag 7*m* when not in use.

The seat support 100*m* further includes an anti-skid portion 12*m* arranged on the back side 1101*m* of the support portion 11*m*. The anti-skid portion 12*a* is an anti-skid layer arranged on the back side 1102*m* and the anti-skid layer 12*m* is made of an anti-skid material, such as silicone, rubber, nylon, and woven materials with rough surfaces. The inflatable member 303*m* is arranged between the back side 1001*m* and the front side 1002*m*.

Referring to FIGS. 28 to 34, the present disclosure provides a seat support 100*n* according to a thirteenth embodiment. The seat support 100*n* is similar to seat support 100*m* in structure. The difference between the two at least includes: the first connecting member 2*n* further includes a sleeve 205*n* connected with the support portion 11*n*, the sleeve 205*n* is sleeved on the support elements 2027 or the table 2022 to connect the first connecting member 2*n* with the front seat assembly 202.

The sleeve 205*n* includes a bag 2051*n*, the bag 2051*n* is configured to receive belongings of user, the bag 2051*n* can also be configured to receive the support portion 11*n*, the first connecting member 2*n* and the adjusting assembly 4*n* when the support portion 11*n* is not connected with the front seat assembly 202. The bag 2051*n* can be closed or opened by a zipper 2052*n*. In another embodiment, the sleeve 205*n* does not have the bag 2051*n*.

Figure 33:
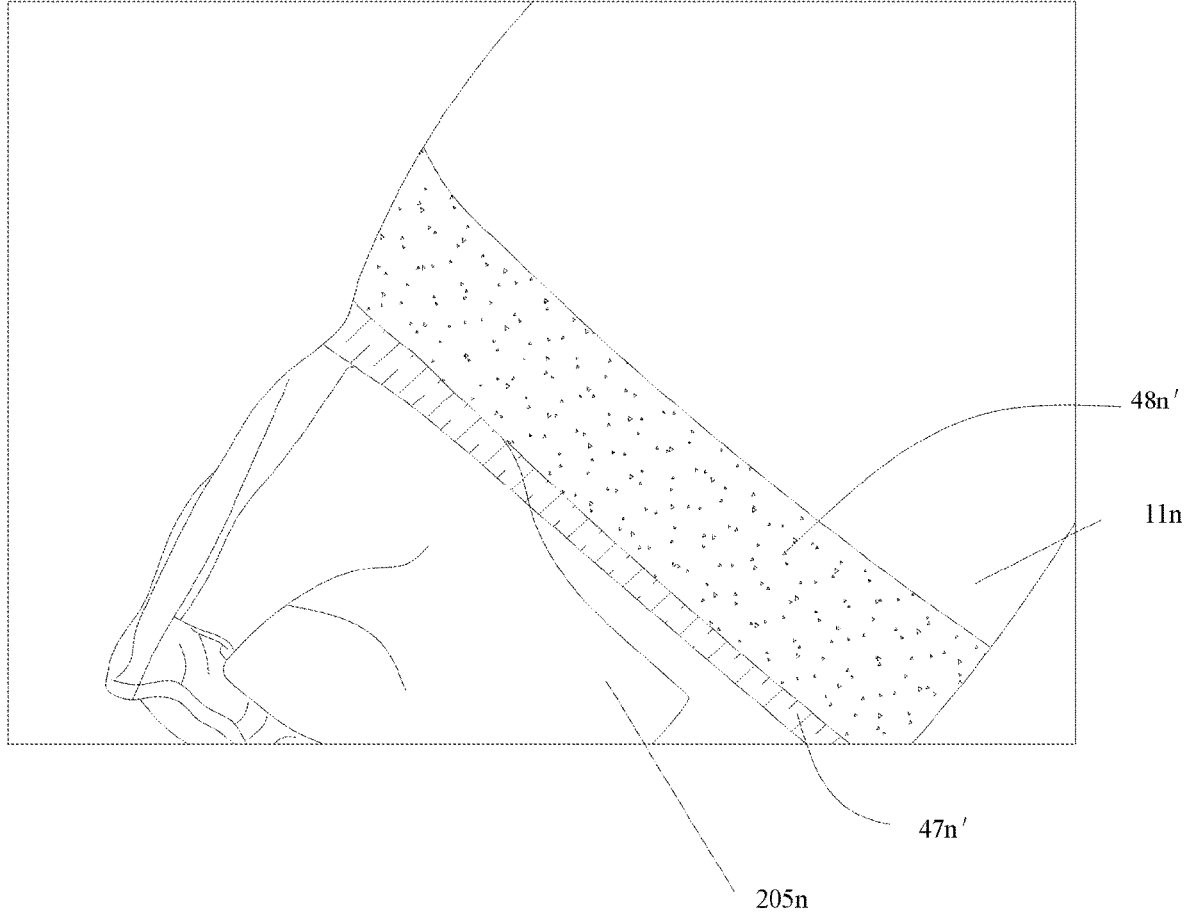
FIG. 33 is a structural diagram of the sleeve, the adjusting assembly and the support portion according to another embodiment of the present disclosure.

The adjusting assembly 4*n* includes a connecting part 47*n* arranged on sleeve 205*n*, and at least one connecting parts 48*n* arranged on the support portion 11*n*. The connecting part 47*n* is arranged perpendicular to the axis of the support portion 11*n*, and the connecting parts 48*n* is also arranged perpendicular to the axis of the support portion 11, a width of the connecting part 47 is substantially equal to that of the sleeve 205*n*, and a width of the connecting part 48*n* is also substantially equal to that of the sleeve 205*n*. In one embodiment, as shown in FIGS. 28-32, the adjusting assembly 4*n* includes a connecting part 47*n* and a plurality of connecting parts 48*n* which are all perpendicular to the axis direction of the support portion 11*n*, the connecting part 47*n* is connected with one of the connecting parts 48*n* according to the gap 2001 between the front seat assembly 202 and the back seat assembly 201, so as to connect the support portion 11*n* with the sleeve 4*n* and prevent the support portion 11*m* from sagging. The seat support 100*n* further include a plurality of covers 49*n*, each cover 49*n* is connected with the support portion 11*n* and configured to cover or expose the corresponding connecting part 48*n*. In another embodiment, as shown in FIG. 33, the adjusting assembly 4*n* includes a connecting part 47*n*' and a connecting part 48*n*', the connecting part 47*n*' and connecting part 48*n*' are hook and loop fasteners and perpendicular to the axis direction of the support portion 11*n*, an area of the connecting part 48' is larger that of the connecting part 47*n*'.

The sleeve 205*n* has two opposite through holes 2053*n*, an edge of one of the through holes 2053*n* adjacent to the support portion 11*n* is provided with the connecting part 47*n*, and a periphery of each of the through holes 2053*n* is provided with an elastic part 2054*n* for preventing the sleeve 205*n* from escaping from the support portion 11*n*. In Detail, a portion of the edge of the through hole 2053*n* adjacent to the support portion 11*n* is provided with the connecting part 47*n*, and another portion of the through hole 2053*n* adjacent to the support portion 11*n* is provided with elastic part. The sleeve 205*n* is further provided with a zipper 2055*n* perpendicular to the axis of the support elements 2027 when the sleeve 205*n* surrounds the support elements 2027. User can surround the sleeve 205*n* on the support elements 2027 easily by the zipper 2055*n*.

Figure 34:
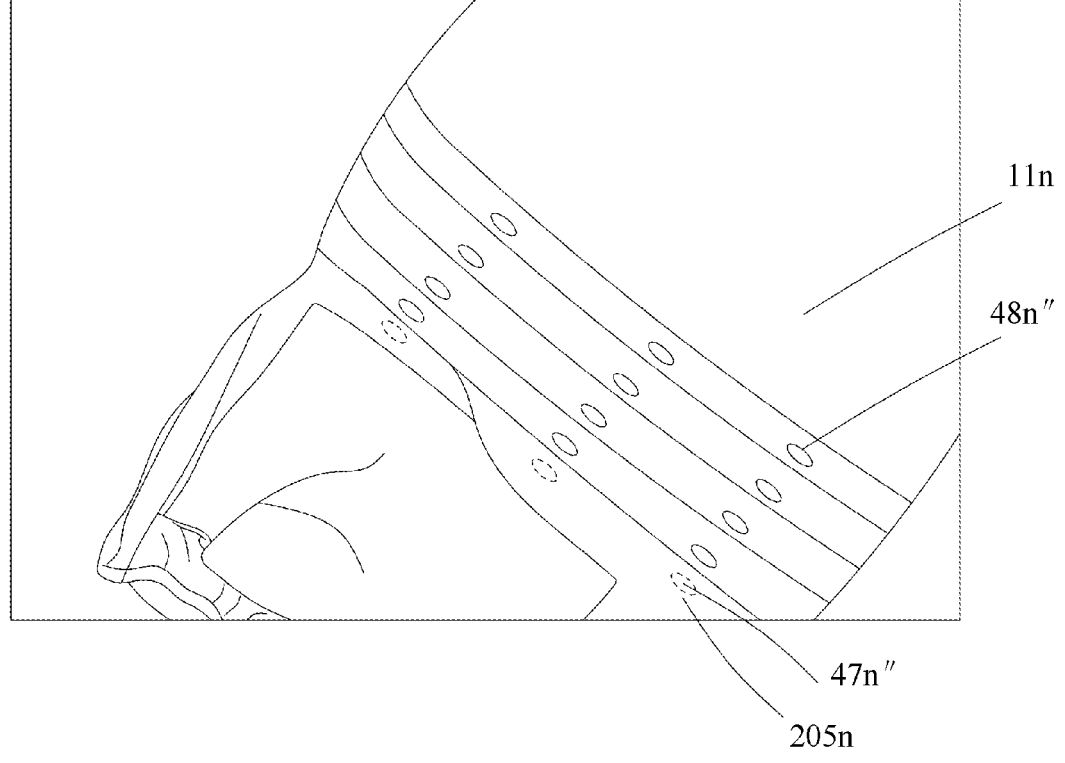
FIG. 34 is a structural diagram of the sleeve, the adjusting assembly and the support portion according to a further embodiment of the present disclosure.

The connecting part 47*n* is a sub-part of a zipper, a hook and loop fastener, a female buckle set, a button set, a clamp, a groove, or a hole. Each of the connecting part 48*n* is another sub-part of the zipper, a hook and loop fastener, a male buckle set, a button set, a clamp, a groove, or a hole. As shown in FIG. 34, the connecting part 47" may be button, a female buckle, a button set, a groove, or a hole, and the connecting part 48" may be button, a female buckle, a button set, a groove, or a hole.

The seat support 100*n* also includes the anti-skip portion 12*m*, the blank 5*m*, the fixing assembly, the bag 6*m*, the clamping member 302*m*, the inflatable member 303*m*, the cushion, and the pillow as recited in seat support 100*m*.

The above description is merely some embodiments. It should be noted that for one with ordinary skills in the art, improvements can be made without departing from the concept of the present disclosure, but these improvements shall fall into the protection scope of the present disclosure.

What is claimed is:

1. A seat support, applied to a vehicle having a front seat assembly and a back seat assembly, the back seat assembly comprises a seat cushion, wherein the seat support comprises:
  a support member, comprising:
    a support portion, arranged on the back seat assembly; and
    a connecting member, arranged on the support portion and configured to connect the support portion with the front seat assembly; and
  a fixing assembly, arranged on the support portion and configured to fix the support portion with the back seat assembly, wherein,
  the fixing assembly comprises a wrapping member connected with the support portion, the wrapping member surrounds at least a part of the seat cushion to fix the support portion on the seat cushion, the wrapping member defines a through hole, at least a portion of an edge of the through hole is provided with an elastic part, and the wrapping member surrounds at least a rear side of the seat cushion of the back seat assembly.

2. The seat support according to claim 1, wherein the back seat assembly comprises a backrest and a seat cushion, a gap is defined between the backrest and the seat cushion of the back seat assembly, the fixing assembly further comprises a clamping member connected with the support portion, an inflatable member received in the support portion, a cushion received in the support portion, or a pillow received in the support portion, the clamping member, the inflatable member, the cushion, or the pillow is at least partially received in the gap to fix the support portion.

3. The seat support according to claim 1, wherein the back seat assembly comprises a backrest, the fixing assembly further comprises a first sleeve connected with the support portion, the first sleeve is sleeved on the backrest.

4. The seat support according to claim 3, wherein the first sleeve comprises a through hole and an inner space, the backrest is received in the inner space through the through hole.

5. The seat support according to claim 1, wherein the back seat assembly comprises a backrest and a seat cushion, the fixing assembly further comprises at least one belt connected with the support portion, the at least one belt is sleeved on the backrest or the seat cushion.

6. The seat support according to claim 5, wherein a gap is defined between the backrest and the seat cushion of the back seat assembly, the at least one belt is sleeve on the backrest, or received in the gap and sleeved on the seat cushion, or sleeved on the seat cushion after passing through the gap.

7. The seat support according to claim 1, further comprising:
  an adjusting assembly, configured to connect the support portion with the front seat assembly according to a gap between the front seat assembly and the back seat assembly to prevent the support portion from sagging.

8. The seat support according to claim 7, wherein the front seat assembly comprises a backrest, a storage bag, a table, and at least one support element configured for rotatably connecting the table with the backrest, the adjusting assembly comprises:
  a first connecting belt, connected with the support portion; and
  at least one first connecting part, connected with the first connecting belt, the first connecting part is connected with the backrest, the storage bag, the table or the at least one support element of the front seat assembly for preventing the support portion from sagging.

9. The seat support according to claim 7, wherein the front seat assembly comprises a backrest, a table, and at least one support element configured for rotatably connecting the table with the backrest, the adjusting assembly comprises:
  a second connecting belt, connected with the support portion; and
  at least two second connecting parts, arranged on the second connecting belt, one of the at least two second connecting parts is connected with another one of the at least two second connecting parts according to a gap between the front seat assembly and the back seat assembly for preventing the support portion from sagging after the second connecting belt surrounds the connecting member or the at least one support element.

10. The seat support according to claim 7, wherein the front seat assembly comprises a backrest, a table, and at least one support element configured for rotatably connecting the table with the backrest, the adjusting assembly comprises:
  a connecting strip, one end of the connecting strip is connected with the support portion, and another end of the connecting strip is connected with the table or the at least one support element for preventing the support portion from sagging.

11. The seat support according to claim 7, wherein
  the adjusting assembly comprises a plurality of third connecting parts arranged on the support portion at intervals; and
  the connecting member comprises two fourth connecting parts, the two fourth connecting parts are respectively connected with two of the third connecting parts for preventing the support portion from sagging.

12. The seat support according to claim 7, further comprising:
  a second bag, connected with the support portion, the second bag is configured to receive belongings of user, or the second bag is configured to receive the support portion, the connecting member and the adjusting assembly when the support portion is not connected with the front seat assembly.

13. The seat support according to claim 1, wherein the front seat assembly comprises a backrest, a table, and at least one support element configured for rotatably connecting the table with the backrest, the connecting member comprises:
  a sleeve connected with the support portion, the sleeve is sleeved on the at least one support element to connect the connecting member with the front seat assembly.

14. The seat support according to claim 13, wherein the sleeve comprises a first bag configured to receive belongings of user.

15. The seat support according to claim 13, wherein the adjusting assembly comprises comprises:
  a fifth connecting part, arranged on sleeve; and at least one sixth connecting part, arranged on the support portion, the fifth connecting part is connected with the at least one sixth connecting part to connect the support portion with the sleeve.

16. The seat support according to claim 1, further comprising:

a blanket, connected with the support portion.

17. A seat support, applied to a vehicle having a front seat assembly and a back seat assembly, the back seat assembly comprises a seat cushion, wherein the seat support comprises:

a support member, comprising:

a support portion, arranged on the back seat assembly; and a connecting member, arranged on the support portion and configured to connect the support portion with the front seat assembly; and an adjusting assembly, configured to connect the support portion with the connecting member at a region of the support portion to prevent the support portion from sagging, wherein, the fixing assembly comprises a wrapping member connected with the support portion, the wrapping member surrounds at least a part of the seat cushion to fix the support portion on the seat cushion, the wrapping member defines a through hole, at least a portion of an edge of the through hole is provided with an elastic part, and the wrapping member surrounds at least a rear side of the seat cushion of the back seat assembly.

18. A seat support, applied to a vehicle having a front seat assembly and a back seat assembly, the back seat assembly comprises a seat cushion, wherein the seat support comprises:

a support member, comprising:

a support portion, arranged on the back seat assembly; and a connecting member, arranged on the support portion and configured to connect the support portion with the front seat assembly; and an adjusting assembly, configured to connect the support portion with the front seat assembly at a portion of the support portion according to a gap between the front seat assembly and the back seat assembly to prevent the support portion from sagging, wherein, the fixing assembly comprises a wrapping member connected with the support portion, the wrapping member surrounds at least a part of the seat cushion to fix the support portion on the seat cushion, the wrapping member defines a through hole, at least a portion of an edge of the through hole is provided with an elastic part, and the wrapping member surrounds at least a rear side of the seat cushion of the back seat assembly.

* * * * *